(12) United States Patent
Thillen

(10) Patent No.: US 9,541,026 B2
(45) Date of Patent: Jan. 10, 2017

(54) HEAT EXCHANGER FOR COMBUSTION ENGINES INCLUDING A HOUSING CONTAINING A REFRACTORY TUBE WITHIN A DIVIDING TUBE ENCIRCLED BY AT LEAST ONE COILED TUBE

(71) Applicant: Thomas V. Thillen, Cordova, TN (US)

(72) Inventor: Thomas V. Thillen, Cordova, TN (US)

(73) Assignee: Phoenix Power Group, LLC, Cordova, TN (US)

( * ) Notice: Subject to any disclaimer, the term of this patent is extended or adjusted under 35 U.S.C. 154(b) by 675 days.

(21) Appl. No.: 13/840,052

(22) Filed: Mar. 15, 2013

(65) Prior Publication Data

US 2014/0183863 A1    Jul. 3, 2014

Related U.S. Application Data

(63) Continuation-in-part of application No. 13/531,207, filed on Jun. 22, 2012.

(60) Provisional application No. 61/499,919, filed on Jun. 22, 2011.

(51) Int. Cl.

| | |
|---|---|
| F02G 5/02 | (2006.01) |
| F01D 15/10 | (2006.01) |
| F01K 7/00 | (2006.01) |
| F28D 7/02 | (2006.01) |
| F28D 9/00 | (2006.01) |
| F01K 13/00 | (2006.01) |
| F28B 1/02 | (2006.01) |

(52) U.S. Cl.
CPC ................ *F02G 5/02* (2013.01); *F01D 15/10* (2013.01); *F01K 7/00* (2013.01); *F01K 13/006* (2013.01); *F28D 7/02* (2013.01); *F28B 1/02* (2013.01); *F28D 7/024* (2013.01); *F28D 7/028* (2013.01); *F28D 9/005* (2013.01); *Y02E 20/14* (2013.01)

(58) Field of Classification Search
USPC .......................................... 60/670; 126/643
See application file for complete search history.

(56) References Cited

U.S. PATENT DOCUMENTS

| | | | | |
|---|---|---|---|---|
| 3,927,659 A | * | 12/1975 | Blake | ........................ F22B 1/00 126/643 |
| 2011/0000407 A1 | * | 1/2011 | Bassett | ..................... F01K 7/36 110/238 |

\* cited by examiner

*Primary Examiner* — Nicholas J Weiss
*Assistant Examiner* — Paul Thiede
(74) *Attorney, Agent, or Firm* — William S. Parks

(57) ABSTRACT

A novel heat exchange device to provide sufficient amounts of heat within a manifold including a working fluid within heating coils to generate electricity through an external combustion steam engine and electrical generator is provided. Such a novel heat exchanger includes coils that surround a central heating compartment thereby exposing such coils to gradually increasing temperatures such that the working fluid is first vaporized and then is ultimately superheated to a "dry" steam upon the point of egress of the heat exchanger leading to the engine portion. In this manner, greater efficiency in heating of the working fluid is accomplished with all of the fluid converted to a gas under pressure to effectuate the necessary engine, etc., movement for energy production.

15 Claims, 20 Drawing Sheets

HEAT EXCHANGER FOR COMBUSTION ENGINES INCLUDING A HOUSING CONTAINING A REFRACTORY TUBE WITHIN A DIVIDING TUBE ENCIRCLED BY AT LEAST ONE COILED TUBE

CROSS-REFERENCE TO RELATED APPLICATIONS

This application is a continuation-in-part of U.S. patent application Ser. No. 13/531,207, filed on Jun. 22, 2012, which claims priority from U.S. Provisional Patent Application 61/499,919 filed Jun. 22, 2011, both applications which are hereby incorporated by reference in their entireties.

FIELD OF THE INVENTION

This invention pertains to a novel heat exchange device to provide sufficient amounts of heat within a manifold including a working fluid within heating coils to generate electricity through an external combustion steam engine. Such a novel heat exchanger includes coils that surround a central heating compartment thereby exposing such coils to gradually increasing temperatures such that the working fluid is first vaporized and then is ultimately superheated to a "dry" steam upon the point of egress of the heat exchanger leading to the engine portion. In this manner, greater efficiency in heating of the working fluid is accomplished with all of the fluid converted to a gas under pressure to effectuate the necessary engine (whether it be a turbine or piston type), etc., movement for energy production or other uses as may deem appropriate. As well, the configuration of the heat exchange device reduces the propensity for ash or other carbon black residues on the coils themselves, thus allowing a significant reduction in insulator build up on the exterior coil surfaces as well as a relatively easy means to clean such residues from the interior of the heat exchanger device as needed. Through such a novel device, highly effective and efficient heating of the desired working fluid is achieved with a high percentage utilization of the combustion source (such as a waste oil, recycled gas, syngas, etc.) with maximum exposure of superheated gases within the working fluid coils. Once the working fluid is utilized in a steam state, the overall system then allows for recycling (condensing) of the working fluid for repeated heating or delivery of certain amounts thereof to the combustion engine as a viable lubricant and coolant. Thus, additionally, this novel heating exchange device may be utilized in conjunction with any type of steam or other manner of combustion engine.

The novel heat exchanger thus allows for an all-in-one electric generator for the combustion of any type of fuel that may be incinerated in order to generate sufficient heat for a working fluid to steam-type engine. Such a novel device allows for greater efficiencies for working fluid vaporization and/or superheating of gases for such a purpose, thereby transferring greater efficiency to the engine component with dry vapor and/or gas. The ability to condense such resultant dry steam (and the like) also aids in the overall performance for the entirely enclosed system, as well. Additionally, this type of combustion engine, utilizing the novel heat exchange device, provides a suitable environment to effectively eliminate the potential for appreciable resultant levels of nitrogen and/or sulfur oxides within the generated exhaust.

The combustion fuel involved may be any type of material that creates the necessary exothermic result upon combustion such that sufficient temperature is generated to produce steam from a working fluid source within the device itself. Such a fuel may be waste or used oil from vehicles or equipment, waste vegetable or cooking oil from restaurants, diesel, gasoline, synthetic gases, natural gases, methane and the like. Thus, a compact high kilowatt generating device may be provided with this heat exchange development, and thus is encompassed within this invention, as well as a method utilizing such a generator to that extent to provide electricity from a compact source into an electric power grid and/or to power lights, equipment, and the like, directly. The heat exchanger may thus actually be utilized in combination with any type of combustion engine device for such a purpose, thus allowing for delivery and/or production of electrical charge in a variety of manners, regardless of the overall size and configuration of the electrical generation system.

BACKGROUND OF THE INVENTION

There are many different electrical generators that have been developed through many years. Many rely upon the burning of fossil fuels (gasoline and diesel, in particular) to create heat that eventually transfers into mechanical energy (through various engine types, such as internal combustion and Stirling engines). Such fossil fuel combustion electrical generators (as well as waste oil burning types), however, create problems with nitrogen oxide (NOx) and sulfur dioxide ($SO_2$) emissions and thus require caution and possible extra filter technologies to protect the user and the environment from such toxic releases (particularly due to the high temperatures required to incinerate liquid fuels that, in the presence of air, create such undesirable byproducts). As well, the specific types of fuel needed for such a device to function are usually limited and expensive due to necessary fuel refinements for such a purpose. Although the resultant kilowatt generation from such a device may be acceptable for short term purposes (power outages, for instance), such a device is highly undesirable in terms of providing electricity to a grid or for sustained periods of time, unfortunately.

Likewise, other past generators have relied upon internal combustion engines that exhibit bulky and/or extremely heavy configurations and require usage in a specific location. Though effective in such configurations, these engines are actually rather elaborate and/or highly inefficient for such a purpose and must use highly refined and expensive fuels to operate. Unfortunately, to operate these engines in the production of electricity has created myriad problems in such that the fuel needed has been ignited in an explosion within the piston cylinder that instantaneously combusts the subject fuel to the point of generating a high temperature but too quickly to properly and completely incinerate the fuel themselves, thus leading to the unwanted creation of NOx and $SO_2$ emissions. In other words, the prior designs for such electrical generating devices at this size and output have been limited in their fuel types (not to mention the proper balance of combustion and exhaust collection) to make it worthwhile for the user to provide a cost-effective electrical generator. As well, as alluded to above, the continued safety issues with fuel combustion exhaust issues renders such prior devices highly questionable in terms of availability at any desired location for actual long term use, particularly without the added expense of emission control components.

In a separate consideration, there exist particularly effective heat regenerative steam engines in U.S. Pat. Nos. 7,080,512, 7,856,822, and 7,992,386 (as examples), all to Schoell, that are configured specifically to be incorporated and introduced within a system wherein the source of water vaporization is waste heat from a manufacturing process. Such systems thus capture heat that typically is unusable and couples such a source with a working fluid that becomes steam (or a like vapor) in order to generate electricity through a modified multi-piston engine. No discussion is made of the potential for incorporating such a specific, effective steam engine with any other type of heat source, and no provision is made for the necessary components required to possibly utilize such a device with any type of heat source other than those specified as exhaust types from large-scale reactors. As such, although such a specific heat regenerative engine is effective in conjunction with certain waste heat sources, the investigation into any viability with any other types of sources, let alone separate engines incorporated directly into such a heat regenerative type apparatus, has not been explored, particularly in terms of a small-scale device, regardless of overall end result in terms of kilowatt generation.

There thus exists a definite need to provide a cost-efficient, effective, environmentally friendly, electrical generator utilizing low square footage genset technology. To date, unfortunately, the shortcomings of the prior devices delineated above leave a gaping omission in the types of generators available to such a degree within the electrical generator industry. This invention overcomes and provides, in a narrow scope, a device that meets all of those goals and with a capability to generate a high amount of kilowatts for introduction within an electrical grid and/or to power lights, equipment, and the like, directly.

Additionally, there has been a noticeable lack of improvements in the heat exchanger industry for implementation with a steam or combustion engine. Past developments have included standard coiled structures that are subjected to heat sources in order to convert, for steam engines, at least, working fluids to vapor and thus transfer of the same to an engine for mechanical motion purposes. The concentration on engine improvements has not yielded any significant modifications for typical heat exchangers of the past, unfortunately. Although most devices of this type are enclosed systems (to reduce loss of heat, at least), the typical configurations employed for such processes allow for direct heat exposure to the target coils without any noticeable variations in temperature. A system that compensates not only for problems that may exist with coil devices that permit instant heating, rather than gradual, and/or further takes into account the potential for coil insulation due to ash and other carbon byproducts from fuel and gas combustion therein, would be quite attractive to the combustion engine, industry, at least. To date, however, and as noted above, such improvements have not been provided.

ADVANTAGES AND BRIEF SUMMARY OF THE INVENTION

It is a distinct advantage of the present invention to provide a genset device that produces at least 6.0 kilowatts of electricity per hour of operation (preferably, at least 6.5, and more preferably at least 8.5) and that has a foot print of, at most, 13.5 square feet of area. It is another advantage of the inventive device and method to utilize the heat of a waste oil, syngases, natural gases, propane, methane, diesel, gasoline, and the like, directly connected to and present as the heat source for a heat regenerative engine to generate the minimum power levels noted above. Another advantage of this invention is the ability of the overall system to utilize a working fluid as a steam resource as well as an engine lubricant, all within a regenerative system that does not require any further introduction of working fluid therein. Additionally, another advantage of this invention is the capability to safely utilize air that is passed through the condensing system so as to provide a heat source within a certain space, open or confined thereby creating a CHP (combined heat and power) device. Yet another advantage of this invention is the capability of providing a suitable heat source through an exchanger that effectively exposes heating coils to different temperature levels, thereby according the working fluid present therein a gradual change from liquid to gaseous state and to a sufficiently high temperature to ensure efficient and high energy within an attached engine device. As well, another advantage is the ability to limit the generation of ash and other carbon byproducts by a combusting flame to areas that are in limited contact with working fluid coils, thus allowing for longer term burn and thus energy output without having to remove insulating byproducts from the coil surfaces. Additionally, a distinct advantage of this invention is the provision of relatively small tubing diameters that permit a greater amount of turns for the heating coils within the heat exchanger device, thus further permitting a larger amount of surface area for more efficient working fluid heating. Still another advantage of this invention is the ability of the heat exchanger to provide gradually increasing temperature levels to the small diameter heating coils in order to provide efficient vaporization followed by superheating to properly provide the desired working fluid in total gaseous state as it transports to an engine for energy conversion to motion.

Accordingly, this invention encompasses an all-in-one electrical generator that requires a total foot print of at most 4.6 square feet of area, wherein said generator includes a frame to which three separate major components are attached and configured in a stacked relation, or in a side by side relationship as the location may warrant, thereto, said components comprising: a) a heat generator component including i) a combustion chamber for the combustion and incineration of a volatile fuel that creates temperature sufficient to evaporate a working fluid into steam upon exposure thereto, ii) an ignition device to spark within said combustion chamber, iii) an air compressor (provided internally within or externally proximal to the system) to atomize a liquid fuel within said combustion chamber; iv) a heat exchanger including at least one small diameter coiled tube within which a working fluid is present and which, upon exposure to the heat generated by said heat generator component, evaporates to become steam therein; b) a steam engine component including i) a plurality of radially configured pistons present in substantially the same plane through which said steam from said heat exchanger passes to create piston movement thereby, ii) rotating a drive shaft, iii) a condenser comprising a cooling area through which said steam passes subsequent to passing through said pistons, v) a radiator, including a radiator fan to condense said steam into a working fluid condensate, or water to water plate heat exchanger along with a means to cool the cooling water (e.g. air handler), vi) a sump for collection of said condensate, vii) one pump to deliver at least a portion of said condensate to said heat exchanger for recycling therein and introduction back into said pistons, and viii) another pump to deliver at least a portion of said condensate to said pistons for lubrication thereof; and c) an electric generator component for which the movement of said drive shaft creates electrical charge; wherein said heat generator is connected directly to said heat exchanger to provide said sufficiently high temperature to said at least one coiled tube. Attached to such an electric generator may be any number of typical electrical system components to allow for transfer to either a specific piece of equipment or a power grid. The method of generating electrical charge through such a heat regenerative system is also encompassed within such an invention. The invention also encompasses, however, a novel heat exchanger device on its own that comprising a housing having a top panel, a bottom panel, two side panels, a front panel, and an end panel, wherein said housing includes therein a heating manifold formed by a refractory tube, wherein said refractory tube is configured in perpendicular relation to and extending from said front panel such that said tube includes an opening within said housing; wherein said housing includes a dividing tube that is configured in perpendicular relation to and extending from said end panel such that said tube includes an opening within said housing and within which is disposed said refractory tube; wherein said housing includes an energy retention disc disposed along the internal wall of said end panel, and thus substantially perpendicular to said dividing tube; wherein said housing includes at least one coiled tube encircling said dividing tube; and wherein said housing further includes at least two exhaust ports disposed within said end panel and with one of said ports disposed between said dividing tube and said top panel and the other disposed between said dividing tube and said bottom panel; wherein said coil tubing is disposed to carry a working fluid into said manifold from an entry point at said back end thereof to an egress point adjacent to the location of said opening between said internal cylinder edge and said front edge of said manifold; and wherein the average number of coils of said tubing present within said manifold is within the range from 25 to 45. Additionally, the utilization of such a novel heat exchanger device in conjunction with any type of working fluid to steam-type engine (i.e., steam engine) is also contemplated, as well as the method of electrical generation including such a combination.

Thus, in one potential embodiment herein described, an all-in-one electrical generator only requires the continued introduction of a fuel source to generate electrical charge; no further introduction of working fluid is necessary for the device to function. As alluded to above, the stacked configuration of components allows for liquid condensation facilitation and proper heat exhaust from the heat generator component. Such a configuration thus permits an efficient electrical generator that has a very small footprint size wise and permits continued introduction of any type of volatile fuel source. The specific system allows for the utilization of waste oils (as one example), thereby permitting a means to reduce the potential for discharge of such undesirable materials into the environment. As noted above, however, the device may utilize any type of volatile material in liquid or gas form for such a purpose. If a waste oil (or like liquid source) is utilized for such a purpose, the combustion chamber includes a further refinement to assure proper incineration thereof, namely an atomizer attached to a feed pump and compressor to ensure the waste oil or like liquid is separated into droplets in the presence of the ignition component. If the waste oil or liquid were present in full liquid form (i.e., highly viscous), the potential to properly ignite the source would be extremely limited if not nonexistent. Thus, the necessity to reduce the waste oil or liquid to sufficiently small droplets permits complete ignition and full utilization thereof of the waste oil for, again, efficient and complete utilization of such a fuel source. An in-line heater may be present, as well, to properly heat the waste oil to a temperature that assists in the atomization and ignition process. Additionally, in some situations, the continuous transfer of such a liquid fuel source into the heat generator may prove difficult as any pressure build up or possible obstacles attributed to the atomization step may create a back-up in the feed line. To compensate for such a potential problem, the device may include an overflow protection component (siphon reservoir) wherein a feed line leads into a reservoir from which a transfer line leads to the heat generator; such a reservoir, however, is set within a larger reservoir that captures any overflow therefrom and is attached to a return feed line to the waste oil or liquid source to ensure the fuel will be eventually utilized for its intended purpose. Alternatively, the overall device may include a direct feed line for the liquid fuel source with a shut off switch in case of overflow or pressure build up problems. Of course, as noted above, if a gas fuel source is utilized, the atomizer would not be needed, nor any overflow protection of the type described. A direct feed line for a gas line may be used with a shut off switch as well in such a situation. Waste oil fuel will be directly pumped into the atomizer eliminating the siphon reservoir.

In greater detail for such a potential embodiment, the steam engine component, as alluded to above, includes a steam line in contact with and thus exposed to the heat generated within the heat generator component, the steam line(s) having an exposed surface area allowing heat transfer in order to change the phase of working fluid within said steam line from liquid to steam. The resultant steam is then delivered to an injector valve within the engine (for passage through the pistons) as well as an exhaust transfer passage for delivering exhaust steam from at least one piston (cylinder) to the condenser. At that point, the exhaust steam changes phase into a liquid in said condensing system prior to collection within a sump (reservoir). Subsequently, the collected condensed working fluid either returns to the steam line or is transferred directly to the engine as a lubricant.

The engine itself for such an alternative embodiment is a drive assembly comprising a plurality of cylinders configured within a single horizontal plane with a related number of pistons movably captivated within each related cylinder and including a piston head structured and disposed for sealed, reciprocating movement within each cylinder; a crankshaft or drive shaft; a crank cam fixed to said crankshaft and rotatable therewith; a connecting rod pivotally connected between said piston and said crank cam; and an injector valve operable between a closed position and an open position to release a pressurized charge of steam into a top portion of said cylinder. Such an engine is thus connected with the steam line described above to allow for the pressurized steam injection to drive the pistons therein in such a manner as to generate sufficient kinetic energy to create rotational movement within the attached electrical generator present below the engine component itself. Such an electrical generator is a typical dynamo, as one example, that permits the rotation of a magnet in the vicinity of a metal coil to generate and capture electrons.

Thus, such a potentially preferred overall device does not waste any of the fuel source needed to generate the proper heat levels to cause vaporization of the working fluid (such as deionized water into steam; other working fluids may be employed as well, such a toluene, for example, to create the same high pressure vaporization thereof) in order to contribute the necessary high temperature steam (or other working fluid result) to initiate the steam engine operation. Subsequent to the steam driving the pistons, etc., of the particular steam engine, the high temperature and pressure vapor is then condensed within the condensing system noted above in order to reform as the starting working fluid. As further fuel source materials are combusted and incinerated, the working fluid is continuously subjected to the high temperatures thereby and the process starts again, ultimately generating at least 6.0 kilowatt per hour of electrical power.

This all-in-one device thus permits the continuous reusability of the particular working fluid utilized therein through thermodynamic and condensation processes. The only necessary actions taken by the user in some fashion would be the continued introduction of proper combustible waste oil or other combustible fuel that can easily create the needed high temperatures to vaporize the subject working fluid. The incineration step is undertaken, as well, within a proper environment to avoid the generation of inordinate amounts of nitrogen and/or sulfur containing gases and thus, even upon high temperature incineration (and thus oxidation), undesirable nitrogen and sulfur oxides are avoided, thus providing a safer electrical generator to that extent. The exhaust from the fuel combustion/incineration still must be dealt with, but coupled with the cleaner burning gases in terms of potentially dangerous oxides, as well as the potential to remove waste oils from the environment in general provides a much improved environmental impact than for other devices for this electrical generation purpose.

Additionally, the potential embodiment of a compact all-in-one device including a combustion chamber and a steam engine with pistons exhibiting radial cylindrical configurations provides a capability in terms of electrical generation that has heretofore been difficult if not impossible to attain from a power per square footage perspective with the fuels identified. The 13.5 square foot all-in-one device provides this highly desirable benefit, particularly in terms of allowing a user the possibility of creating sufficient power to augment the electrical requirements within a facility, reducing the electrical power needed during operation, reducing the cost impacts of a facility peak power demand, and/or the capability of generating revenue through the sale of power to a local electrical grid. The compact configuration allows for ease in transportation and shipping as well as a rather easy manner of finding a proper location (from a ventilation as well as heat sensitivity perspective, at least) for placement during utilization. As well, such a small and compact size facilitates the ability of the user to move the device to any place for grid and/or electrical panel connections, too.

Thus, the potential embodiment for this device includes all of the specific components required of the specific steam engine component as well as the proper connections between that component and the combustion chamber (heat generation) component to allow for the proper, continuous (on-demand), and effective generation of heat from the incineration of the selected fuel source. Such will be described in greater detail below, but of great necessity for this particular device and method to be utilized, and, in particular, to be properly configured to allow for proper transfer of the fuel source through the combustion chamber component of the all-in-one device. This process step utilizes an oil pump (for waste oil) or proper supply tubes (for gaseous fuels) in order to introduce the fuel source into the combustion chamber, initially through the aforementioned dual container reservoir or direct feed line. The waste oil or other fuels is provided in an external tank (that is not considered part of the inventive all-in-one device) and is connected through a proper pipeline in the manner described above. The fuel source is then moved through the pipeline (again, via either an oil pump or siphon line) through a filter (to remove large debris or other undesirable materials, such as dirt, for instance) and then introduced within the combustion/incinerator chamber (with optional pass through a dual container siphon reservoir in order to allot the proper amount of fuel; the optional reservoir is not needed for gaseous fuel because the phase it is in, as noted above). Being of a relatively small and compact structure, the proper configuration to create such a result without appreciably effecting the other components of the overall device is of great importance. The fuel then travels from the reservoir to the heater(s) which provides sufficient heat to increase the temperature of the waste oil fuel source to allow for proper and immediate atomization and ignition, but prior to actual incineration thereof. The power for the heater(s) is initially provided through the electrical panel/grid tie or an electrical battery. The heated fuel source is then moved into the actual combustion/incineration chamber. Being of a relatively small and compact structure, the proper configuration to create such a result without appreciably effecting the other components of the overall device is of great importance.

Furthermore, this all-in-one device embodiment design is a tower configuration with a proper exhaust port at the top portion thereof, and a rectangular bottom portion that is in contact with a relatively flat surface for proper stability. The maximum overall height of the device is roughly 84 inches, while the square bottom portion is, as noted above, about 13.5 square feet in area at a maximum and as an optimal dimensional measurement.

As further described above, another aspect of this invention is the provision of a novel heat exchange device in order to provide efficient means of vaporizing and superheating working fluid within an overall electrical generation system context. Initially, it is important to note that this novel heat exchange device performs two basic functions in that it effectively and efficiently combusts fuel of any liquid or gaseous type to produce heat and it transfers such heat to a working fluid flowing through small diameter tubing. As such, the fuel must either be already in proper gaseous state (such as, for one non-limiting example, methane) or liquid form that is capable of being atomized by a combination of pressure and compressed air through a dispersing nozzle assembly. In this manner, the initial combustion process provides the necessary status of the combustion fuel to ignite and continuously and substantially evenly burn for the proper heat source to take effect. The liquid fuel is atomized, dispersed into fine droplets and vapors with air, and delivered and metered by the action of a pump device (such as, for example, a positive displacement pump). This pump delivers a certain volume of fuel with each revolution, thus allowed for a controlled ("metered") delivery rate by, for example, the rotational speed of a driving motor. Gaseous fuels may be delivered in a like manner through the utilization of, for instance, a pressure regulating valve and an orifice. In that situation, of course, a fuel pump is unnecessary. However, the overall device may be properly outfitted with alternative delivery means to allow for the utilization of alternative fuels on demand for thus purpose. Likewise, the device may also include means to remove one delivery option and replace it with another for this purpose, as well.

As noted, again, the capacity to permit greater efficiency in properly heating a working fluid basically starts with the utilization of significant available surface area for heat transfer within the confines of the heat exchange device itself. To that end, the initial consideration was realized that small diameter tubing (preferably from ⅜" to ½") provides the best results in this respect, particularly with the capability of allowing for a larger number of coils present in sequence throughout the manifold. In this manner, the smaller the tubing, the greater the coil number, and, as a result, the larger the surface area present to effectuate the heat transfer thereto. The tubing system inside the combustion chamber is the actual component wherein heat is actually exchanged from the chamber to the working fluid present therein. Through the utilization of a mechanical pump, the working fluid is transported from a condenser to the entry point within the heat exchange device. Thus, with such a large surface area made available for heat transfer, the overall process becomes extremely efficient.

Beyond that, however, is the further realization that the introduction of the coil tubing within a specific location of the heat exchange manifold allows for even greater efficiencies that have yet to be considered within this art. Of particular importance is that it has been discovered that the heat source placement within the heat exchange device manifold on one end thereof allows for greater amounts of heat to be directed outwardly toward the opposite manifold end. The presence of the aforementioned reflection plate allows for heat to be properly "collected" as well as directed in the opposite direction, as well as to create significant turbulence within the manifold itself. This allows for a significant increase combustion efficiency of the fuel. The overall temperature at the manifold openings created by the internal cylinder is around 1,800 to 2,000° F. At that point, the hot gas flow moves "downstream" within the outer compartment of the heat exchange manifold, flowing past and around the initial super-heating portion of the tubing to its point of entry within the manifold (the vaporizing section). From the high temperatures noted above, the gas flow cools to a temperature of around 900° F. even a limited distance into the outer compartment. At that point, as well, the working fluid would exhibit an approximate temperature of 400° F. As the gas flows further toward the exhaust port, the gas has transferred its reduced heat to the working fluid within the coil tubing, with a temperature of about 400° F. for the gas at the exhaust port (e.g., the gas egress point) and about 110° F. for the working fluid at the same location (e.g., the working fluid entry point). Thus, with these temperature variations, it can be easily understood that the working fluid moves to higher temperature regions in a gradual path, thus facilitating, again, heat transfer from the initial vaporization phase to the super-heating phase within the inventive heat exchange device. Thus, the ability to "control" the heat level in this manner provides a highly unexpected benefit for the overall heat exchange method in that the working fluid will be subject to heat transfer at its entry point within the manifold at a temperature that is lower than at its egress point from the manifold. This, in turn, allows for a gradual temperature climb for the working fluid and thus at least a dual step heating procedure, which has been realized as of vital importance since this is a "counter flow" heat exchange process where two fluids exchange thermal energy according to the first law of thermodynamics (e.g., heat flows from a higher temperature to a lower temperature). Initially, then, the working fluid would thus be subject to sufficient temperature to vaporize into steam. As it continues to move through the coil tubing, the temperature continues to increase thereby allowing for thermal energy increases to the point that superheating of the resultant vapor to occur. Such a process effectively removes further moisture therein and resulting in highly prized "dry" steam as a result. Again, coupled with the small diameter, and thus high surface area, coils, the ability to provide such gradual heating from the exhaust port location to the highest temperature location on the manifold provides a highly beneficial efficient process heretofore unattained within this industry.

This overall configuration for the novel heat exchange device, however, provides yet another important benefit that has heretofore not been properly investigated. With the presence of the heat source (the combustion chamber, if you will) disposed of on one end of the heat exchange manifold, and the presence of the internal cylinder creating the refractory tube, the actual combustion action results in the generation of a flame within a nearly confined structure. As noted above, and as described in greater detail below, the combustion flame directs heat outwardly into the manifold (and within the internal cylinder) to the reflecting plate. Any combustion byproducts are likewise directed in a similar manner. Thus, ash or other carbon-based materials are primarily generated within this region of the heat exchange device. The configuration of the manifold including a 180 degree turn (e.g., reverse direction) from the back panel (including the reflecting plate) back toward the front panel (including the heat source as well as the opening to the outer compartment external to the internal cylinder) the then another 180 degree turn from the front panel to the exhaust port creates not only the turbulence necessary to efficiently combust the fuel therein, but also great difficulty for any solid soot or coke materials (combustion byproducts, particularly from hydrocarbon-based fuels) to make their way to the outer compartments and thus to the coil tubes. In this manner, the potential for insulating ash or coke materials contacting and adhering to the coil surfaces is drastically reduced. Particularly due to the momentum generated from the heat source direction within the manifold and the requirement for excessive direction change thereafter to actually reach the coil tube surfaces in the first place, such a beneficial result is made possible.

Additionally, though, is the further potential to generate extremely effective combustion results such that the flame may be properly controlled to a level that ensures high temperature levels. To that end, at the outset, the initial design may include the utilization of, for example, two electrically powered heaters for higher viscosity liquid fuels (i.e., waste oil, and the like). One heater would thus be mounted on the liquid fuel supply prior to the burner assembly and the second would be mounted on the final delivery pipe just in advance of the atomizing nozzle. This configuration aids to optimize fuel utilization through the dual process of fuel atomization and vaporization. In this situation, then, upon delivery of the fuel to an atomizing nozzle, compressed air (referred to as, for example, "primary air" or "atomizing air") is also mixed (through a controlled flow) with the liquid prior to nozzle exit. An electric spark then ignites the compressed air/liquid fuel mixture within the burner assembly such that upon the generation of a single spark, as long as further air/fuel flows to this point, the fuel ignition process becomes continuous and self-perpetuating.

Thus, the compressed air performs a dual function for the combustion step: it facilitates atomization through its compressed nature and it introduces the necessary oxygen to provide a "rich mixture" for proper combustion to occur in the first place. With a non-atomized liquid fuel, the capability of actually burning such a material is extremely low; couple that with an anaerobic environment and there is little chance that ignition will start, let alone perpetuate thereafter. The "rich mixture" thus allows for a controlled ignition to commence with remaining air/oxygen within the combustion chamber thus aiding continued ignition and burning of the provided fuel for this purpose. Such secondary supplies of air and/or oxygen may be provided via a forced draft fan, driven by an electric motor and adjustable in its delivery rate through a damping mechanism. The ability to control total air flow within the combustion process is quite important as an excess of such a supply will actually result in a reduced temperature flame (e.g., visibly short and brilliantly yellow-white in appearance). With such a possible cooling effect, the excess air actually reduces the temperature for the combustion chamber below that for an ideally adjusted flame. An insufficient supply of air (or too low a level of air flow) creates a long yellow-orange flame that indicates the amount of hydrocarbon being burned is too much in the presence of the needed oxygen. This results, generally, in the production of highly undesirable levels of ash (again, as noted above, unburned carbon and/or other materials present within the fuel). With this situation, the ideal temperature is again not reached; additionally, though, such ash (and other byproducts) may form a heat transfer blocking coating on the working fluid tubes, particularly if the amount of ash generated is rather large (which occurs typically when the atomizing air, etc., is too low). The presence of the super-heated region of the coil tubes near the front panel of the manifold results in the significant potential for soot or coke coating in such a coil area. The isolative properties of carbon deposits of this nature could deleteriously affect the heat transfer property requirements of such specifically configured tubes. Thus, as noted above, the inventive heat exchange device has been properly configured to compensate for such a possibility through the disposition of the combustion chamber in a region of the manifold that makes ash or coke movement rather difficult to reach the coil tubes themselves. The refractory material of the manifold basically forms a physical containment for the burning fuel flow. Additionally, the heat exchange device may be disposed in relation to an overall electric genset such that the front panel is actually placed horizontally rather than vertically, thereby resulting in a combustion chamber with a flame that is directed downward into the manifold, rather than horizontally therein. As such, the refractory material is beneficially capable of maintaining its form and shape, regardless of its proximity to the combustion flame (and thus upon exposure to the elevated temperatures associated therewith). Furthermore, such materials exhibit a low coefficient of heat transfer, thereby preventing any appreciable amount of heat to pass through the manifold (resulting in the exhaust port being the primary source for such heat dissipation). As noted above, then, the turbulent effect of redirected heat as well as the presence of materials that cause such redirection, facilitates not only increased temperatures at the coil/heat interface, but also the propensity to effectuate complete and efficient combustion of the fuel source itself. Thus, not only is it difficult for any ash or coke materials to actually transfer through the manifold to the coil surfaces in the first place, the actual configuration of the heat exchange device drastically reduces the level of combustion byproduct potential, too (particularly since the combustion gas flow is at its peak temperature in that region of the manifold at about, again, 1,800 to 2,000° F., quite sufficient to burn excess fuel). Any combustion particles that remain within the combustion chamber or manifold will likely be consumed within the overall system or will be generated as light dry inert ash that can be easily cleaned from the manifold. If any residue of this sort adheres to the coil tubing, such will not have an appreciable effect on heat transfer. As well, the configuration of the inventive heat exchange device further facilitates cleaning through the utilization of hinged doors, and the like, and the removability of all components parts as needed for inspection and ash, etc., cleaning. Any other particles that may be present or generated therein (for example, entrained mineral or metallic particles) will also predominantly remain within the combustion chamber where they will be either burned or easily removed during a periodic cleaning.

The inventive heat exchange device enclosure is preferably fabricated from sheet steel which provides sufficient structural support to the heat exchange tubing, refractory cylinders in the combustion chamber, the refractory disc, and the burner assembly. As noted above, access for cleaning, inspection, and service is through the two end doors which can be removed with bolts or swung open on hinges and at either end (the front panel or burner end or the end panel or exhaust end, as discussed above). The inner perimeter of the manifold housing is lined with insulation to minimize the loss of heat to the exterior and reduce the exposure of nearby personnel to thermal burns from hot surfaces (which can also aid in the directing the hot gas flow towards the heat exchange tubing).

The pressure containing parts of the inventive heat exchange device, such as the vaporization and super-heater tubing, may be constructed with corrosion resistant stainless steel, mild steel, or a combination of both (preferably from alloy 316). Such tubing materials should exhibit a design burst pressure of at least 10,000 Pounds per Square Inch (PSI). Additionally, the super-heater outlet is preferably fitted with a pressure relief valve for various reasons. Such a valve is preferably one that is rated by the American Society of Mechanical Engineers (ASME) as capable of relieving excessive pressure and volume of working fluid to a safe discharge point. The working fluid itself should exhibit chemical properties specifically for resistance to corrosion of the pressure parts.

Furthermore, other instrumentation installed on the inventive heat exchange device monitors for inlet and outlet pressures and working fluid supply pump flow. Thermometers for measuring working fluid inlet and outlet ports and combustion product temperatures (upon egress, in particular) are also possible for the overall electrical generation system including the inventive heat exchange device. If desired, as well, a simple sight port may be installed near the burner for monitoring and adjusting the air flow for proper combustion of the supplied fuel. The burner assembly itself may thus also include a variety of pressure gauges for monitoring air and primary atomizing air supply and indicating lights for power available to the burner and burner in-operation status.

BRIEF DESCRIPTION OF THE DRAWINGS

FIGS. 12A-12D illustrate reciprocating movement of a piston within a cylinder from a top dead center position through an exhaust stroke.

DETAILED DESCRIPTION OF THE PREFERRED EMBODIMENTS AND THE DRAWINGS

In order to provide greater detail of the inventive electrical device, non-limiting drawings and descriptions thereof. The ordinarily skilled artisan would understand that the scope of the overall invention is not intended to be limited in view of such drawings and descriptions.

Figure 1:
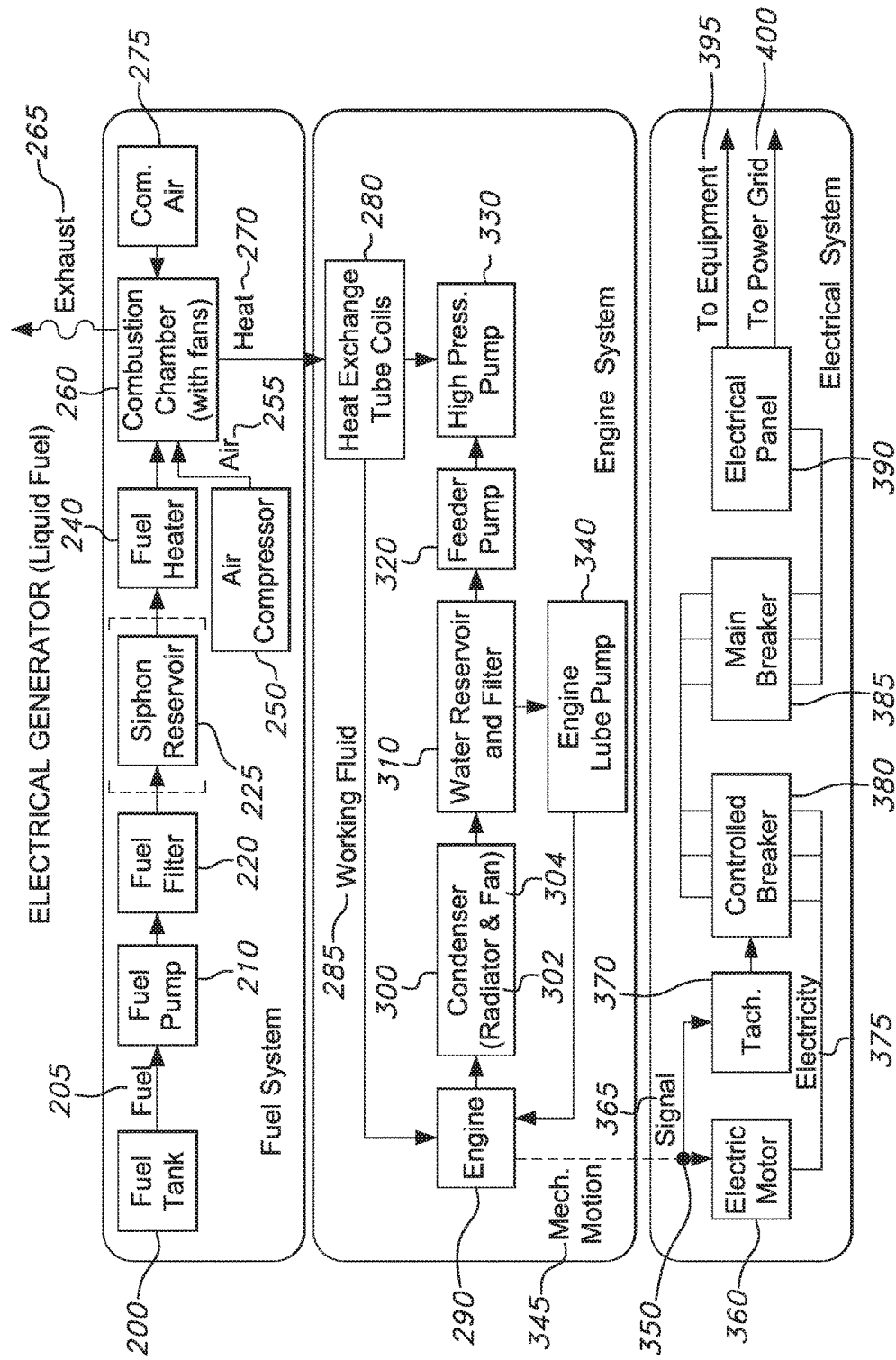
FIG. 1 is a flow chart diagram of the overall electrical generation system described herein utilizing a liquid fuel combustion method.
Figure 5:
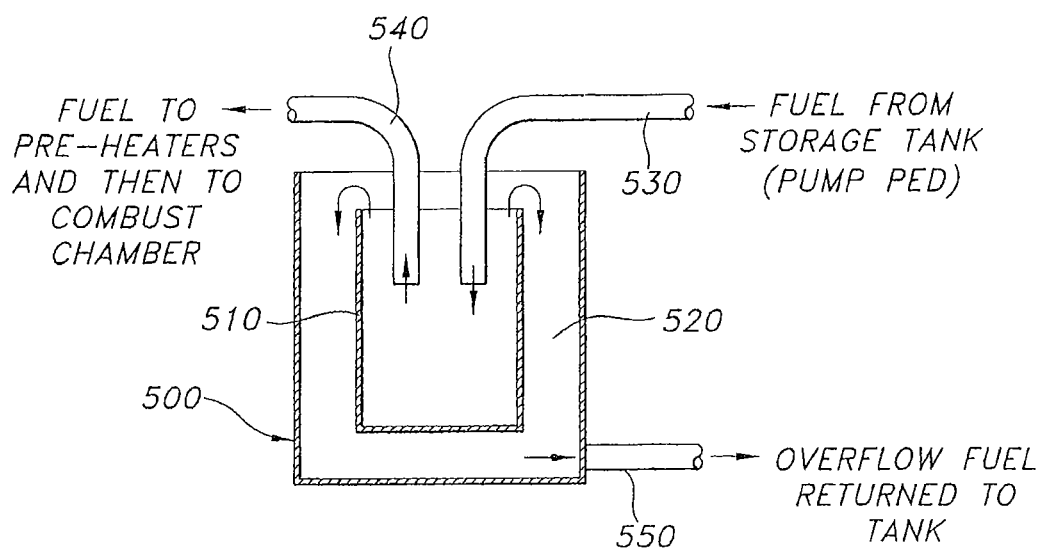
FIG. 5 is a side cross-sectional depiction of a potentially preferred embodiment of a double wall siphon reservoir present within the inventive electrical generation device.
Figure 6:
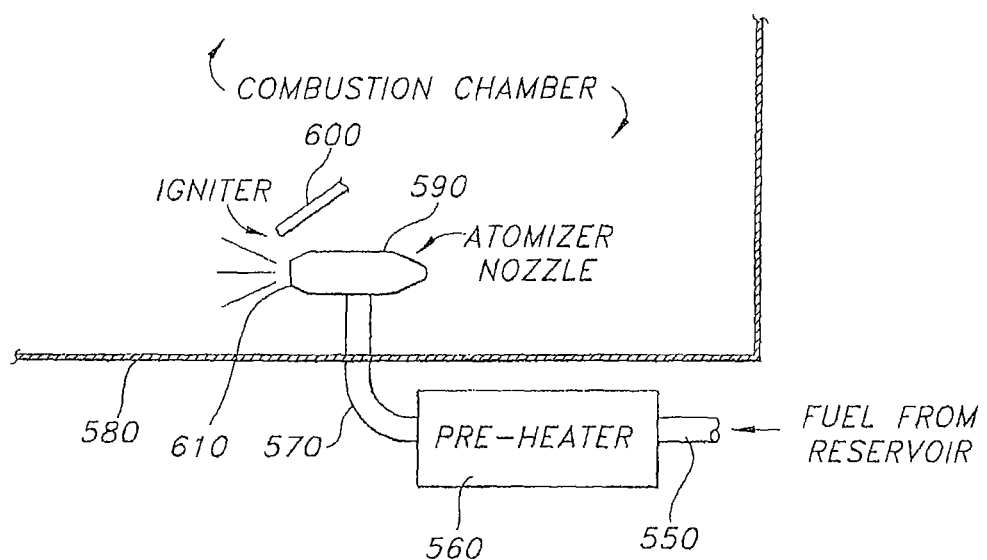
FIG. 6 is a side cross-sectional depiction of an embodiment of the internal portions of the combustion chamber of the inventive electrical generation device for the incineration of liquid fuels.

In accordance with a preferred embodiment hereof, FIG. 1 shows the overall inventive method followed in flow chart format. The overall system includes three distinct subsystems, being the fuel subsystem, the engine system and the electrical system. All three are sequentially connected to one another to provide electrical generation capability through the burning of a fuel within the fuel subsystem to create heat 270 to generate steam 285 to run the engine 290 in the engine subsystem which, in turn allows for electricity 375 to be generated by a motor 360 within the electrical subsystem. Within the fuel subsystem fuel is stored in a fuel tank 200 (which may be replenished as needed externally). The fuel 205 is transferred via a pump 210 through a filter step 220 then to a pre-heater 240. Optionally, the system may include a such as a direct feed line or siphon reservoir 225 such as shown in FIG. 5, to distribute a suitable amount of fuel in an efficient manner through to the combustion chamber 260. Otherwise, a direct feed line transfers the fuel in such a manner. The pre-heating step 240 heats the fuel to a temperature between 120 and 160° C., which then leads the pre-heated fuel to a nozzle present within the combustion chamber 260 for atomization and incineration in order to generate heat 270. The preheating step 240 particularly facilitates atomization thereof (such as shown in FIG. 6) by generating the proper viscosity to, in turn, facilitate incineration within the combustion chamber 260. Atomization is facilitated by the introduction of air 250 through a compressor, as well. Upon combustion (incineration) 260, the exhaust is generated and released into the surrounding environment 265. The resultant heat 270 generated from the combustion step 260 is then captured and transferred to the engine subsystem.

Within the heat subsystem, the heat 270 from the fuel subsystem is exposed to heat exchanger tube coils 280 within which is present a working fluid that evaporates to form steam 285 therein. This steam/working fluid 285 is then transferred to a multi-piston engine 290 whereupon the steam pressure forces the pistons therein to move back-and-forth within cylinder housings (as in FIGS. 7 through 12D). The steam is then condensed 300, through exposure to a radiator 302 and a cooling fan(s) 304 to lower the temperature of the working fluid to create a liquid condensate stored within a reservoir 310 (including a filter to remove any impurities). The condensed working fluid is then transferred to one of two pumps: a feeder pump 320 moves the working fluid to a high pressure pump 330 for reintroduction within the heat exchanger 280, while and engine lube pump 340 transfers the condensed working fluid into the piston engine 290 to act as a lubricant therein.

The moving pistons of the engine subsystem are connected to an electric motor 360 through a crankshaft (as in FIG. 4), to transfer the mechanical energy 345 generated thereby to a generator/electric motor 360 (such as a dynamo) to create electrical charges as a result. The crankshaft motor assembly 360 is connected to a tachyometer 370 that reads the signal 365 from the motor 350 to indicate the speed of the motor during use. The motor 360 can thus generate a certain amount of electricity 375 from such mechanical energy 345, sending such electrical signals and charges to a controlled relay 380, a main breaker 385, and then to an electrical panel 390 to permit the controller to decide the target destination of the generated electricity, whether it be a power grid 400 or a stand-alone piece (or pieces) of equipment 395.

Figure 2:
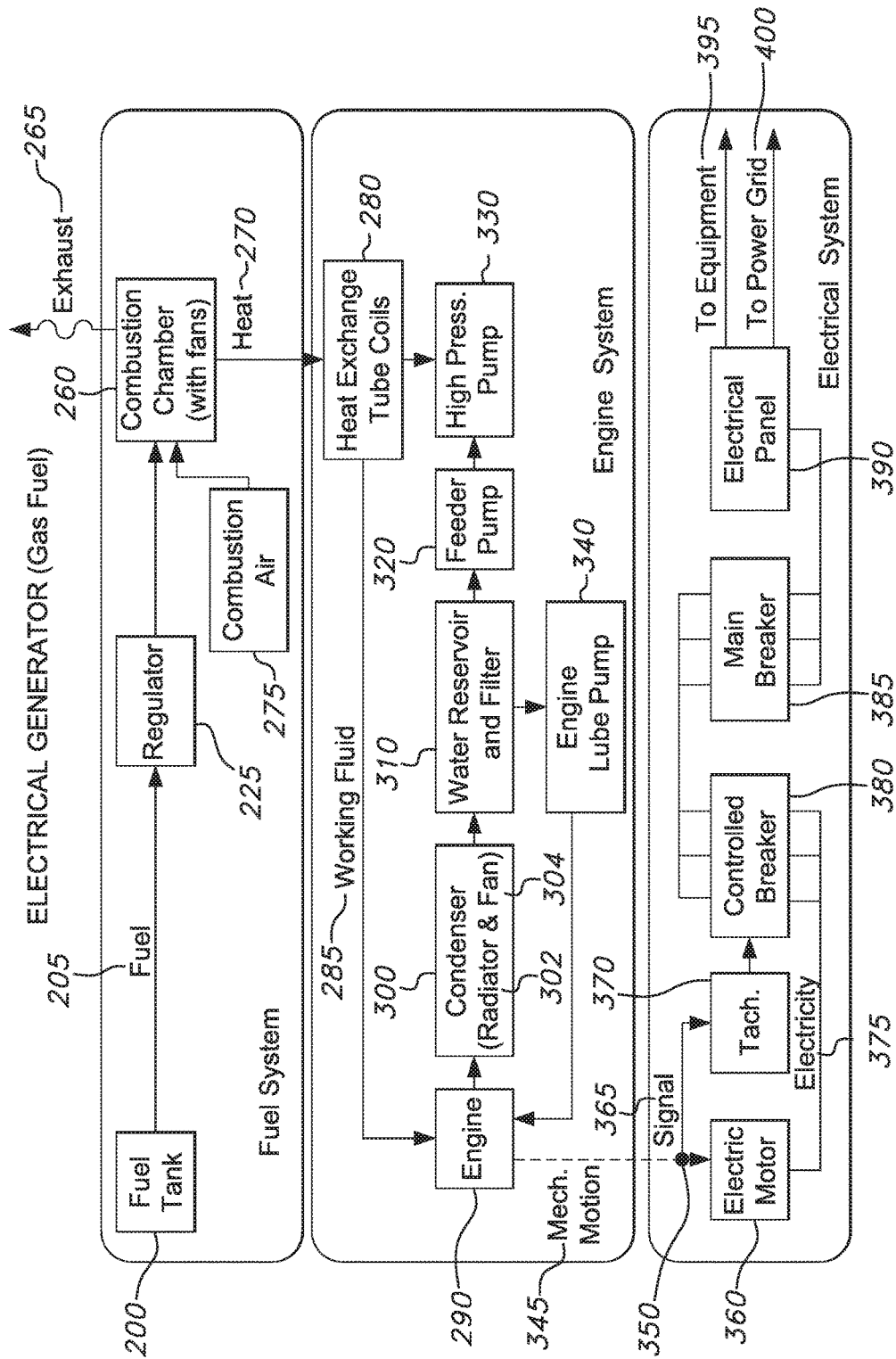
FIG. 2 is a flow chart diagram of the overall electrical generation system described herein utilizing a gaseous fuel combustion method.

FIG. 2 provides an alternative device but utilizing gaseous fuels, rather than liquid fuels. In such a device, there is a direct feed into the incinerator step 260, instead, and no atomization component necessary.

Figure 3:
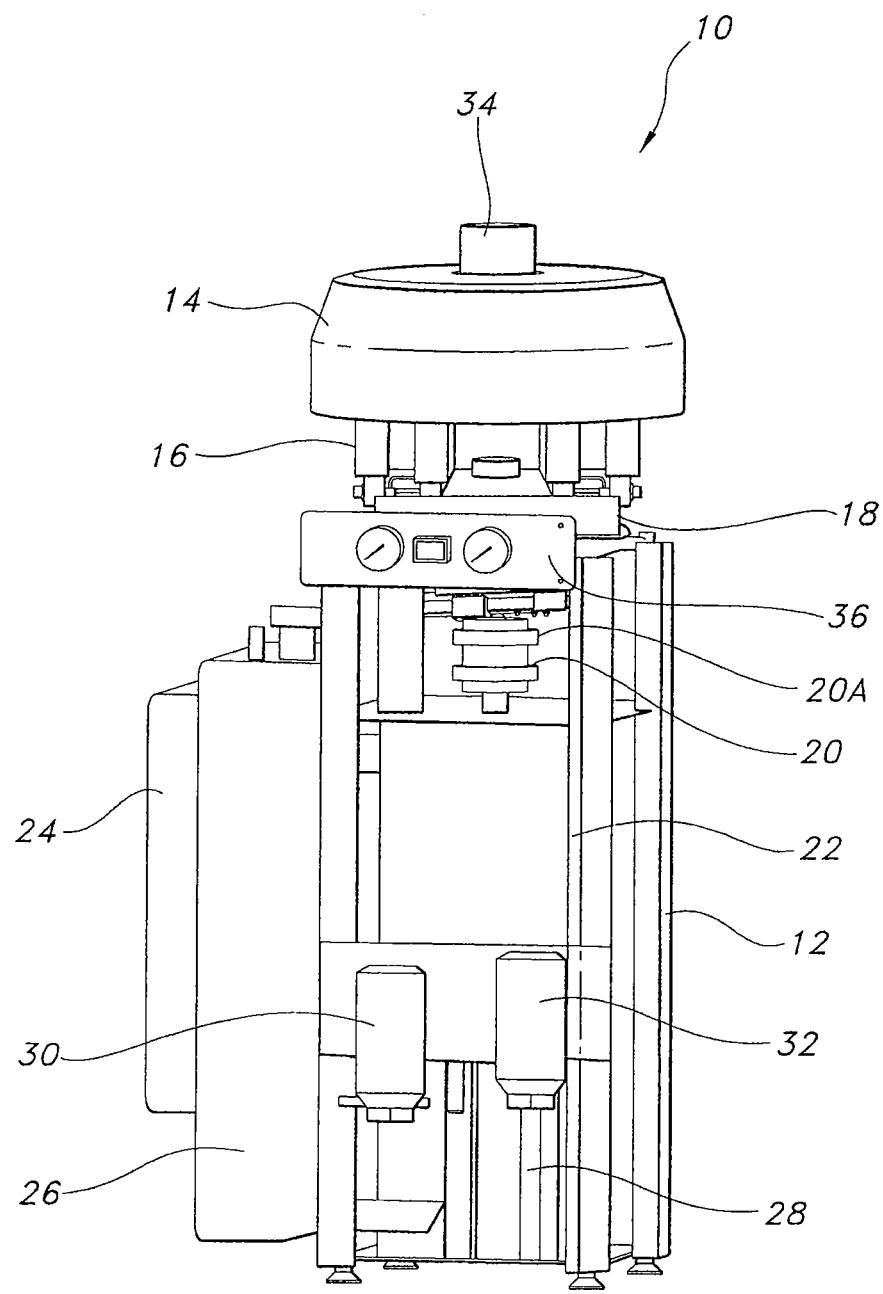
FIG. 3 depicts one potentially preferred embodiment of the overall electrical generation system as depicted in FIG. 1.

With such an overview, there is provided, in FIG. 3, a low-footprint electrical generation device 10 that weighs approximately 600 dry weight pounds and requires only 4.6 square feet of space (and a proper location for the exhaust and any heat to dissipate safely). The device 10 is present on a 4-legged frame 12 to allow for the vertical placement (i.e., stacked configuration) of the individual components (as defined in FIG. 1 as the subsystems, in essence). At the top of the device 10 resides a combustion chamber 14 that is structured to allow for a heat exchange unit to rest comfortably therein and in sufficiently close proximity to an incinerating component (as in FIG. 6, for instance). As well, the combustion chamber provides a cyclonic movement of the heat generated therein to provide thorough exposure to the coils (166 in FIG. 4, for example) present within the heat exchanger component. An exhaust pipe 34 is present in the middle and atop of the combustion chamber 14 to permit proper release of incinerated fuel exhaust. A working fluid (such as tap water, deionized water, toluene, a low carbon alcohol, and the like) is present therein said coils during the incineration step within the combustion chamber 14. Upon exposure to sufficient heat therein, the working fluid evaporates to form a steam (at temperatures between 400 and 1,000° F.) which is then pumped through insulated steam lines 16 on the device 10 downward to a multi-piston engine 18. The pistons (as in FIGS. 7 through 12D) are then permitted to stroke through the steam presence, thereby creating mechanical energy that is then transferred via a crankshaft 20 to an electrical generator 22. A crankshaft coupling 20A is provided to prevent the spinning of the electric generator 22 to drive the engine 18 if the engine 18 slows or stops operating. Simultaneously, the working fluid in steam form subsequently moves from the engine 18 to a condenser unit 23, including a radiator 26 and cooling fan(s) 24 to which all liquid condensate is then moved to a water reservoir 28. The supply of working fluid is then transported back to the heat exchanger within the combustion chamber 14 via a feeder pump 32 or sent directly to the engine 18 to act as a lubricant therefore. Additionally, gauges 36 are included to monitor pressures, RPMs, and other like physical properties throughout the overall device 10.

Figure 4:
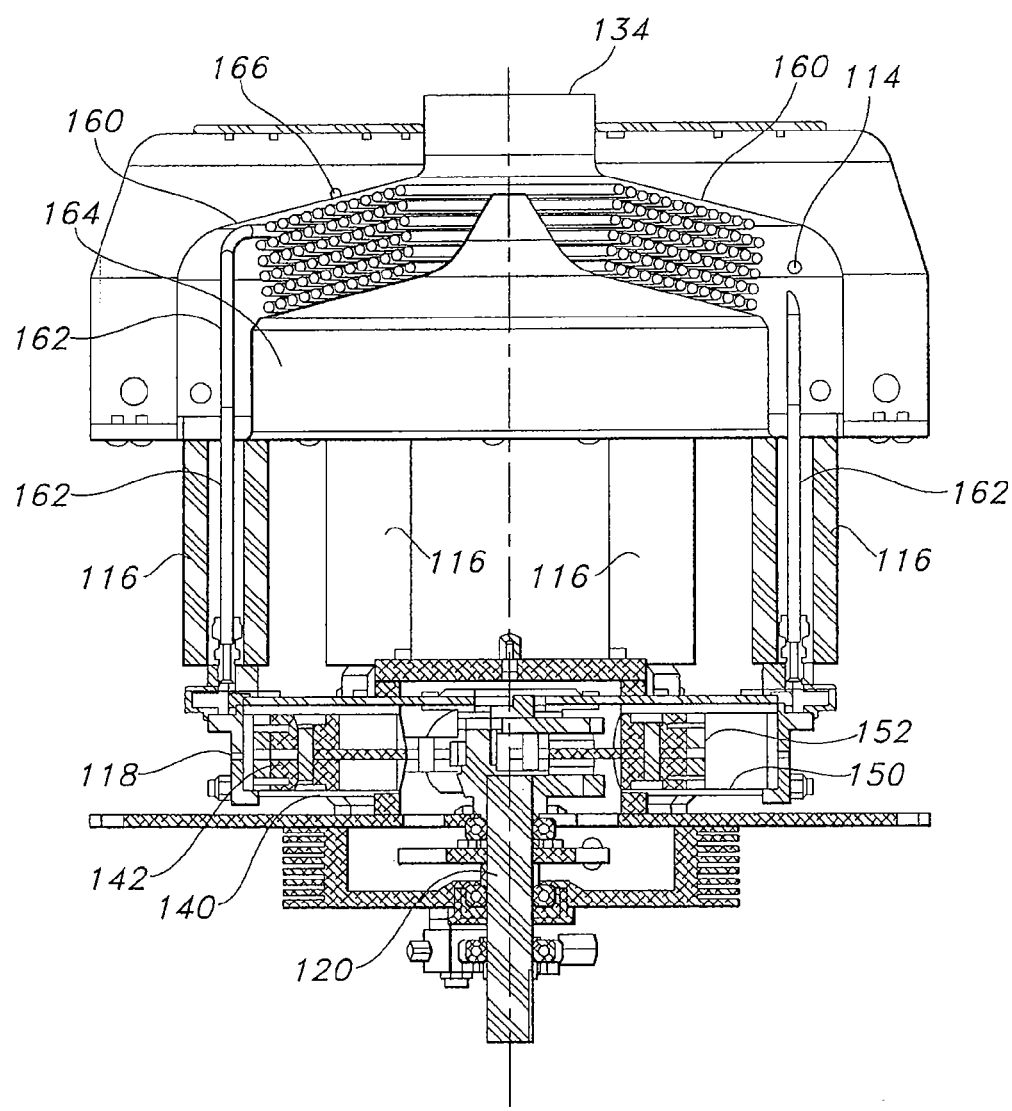
FIG. 4 is a side cross-sectional depiction of the combustion and engine components of the electrical generation device shown in FIG. 3.

FIG. 4 shows the internal components of the fuel and engine subsystems of the inventive device of FIG. 3. The combustion chamber 114 is covered by an insulated shroud 160 (made from a suitable metal to withstand high temperatures and to maintain internally generated heat therein) within which is housed an incinerator (FIG. 6). The chamber 114 is configured to allow for cyclonic circulation of heat around heat exchanger coils made from, as one example, stainless steel. A working fluid is introduced within the coils through a pressure pump, whereupon the surface area for heat exchange accorded by the coils facilitates steam generation in an efficient and effective manner. Insulated steam lines 162 are directed to the engine cylinder 18 to allow for transfer of the steam to the engine 18. An exhaust pipe 134 dissipates exhaust from the incinerator into the surrounding environment.

The steam lines 162 thus move steam into a manifold 524 that leads to the engine cylinders 140, 150 of the engine 141, to drive the pistons 142, 152 in order to generate mechanical energy through continued stroking of the pistons due to the steam moving there through. The pistons 142, 152 include connectors 118 that are connected to a camshaft 120 that translates the piston movements downward to an electrical generator.

Figure 3A:
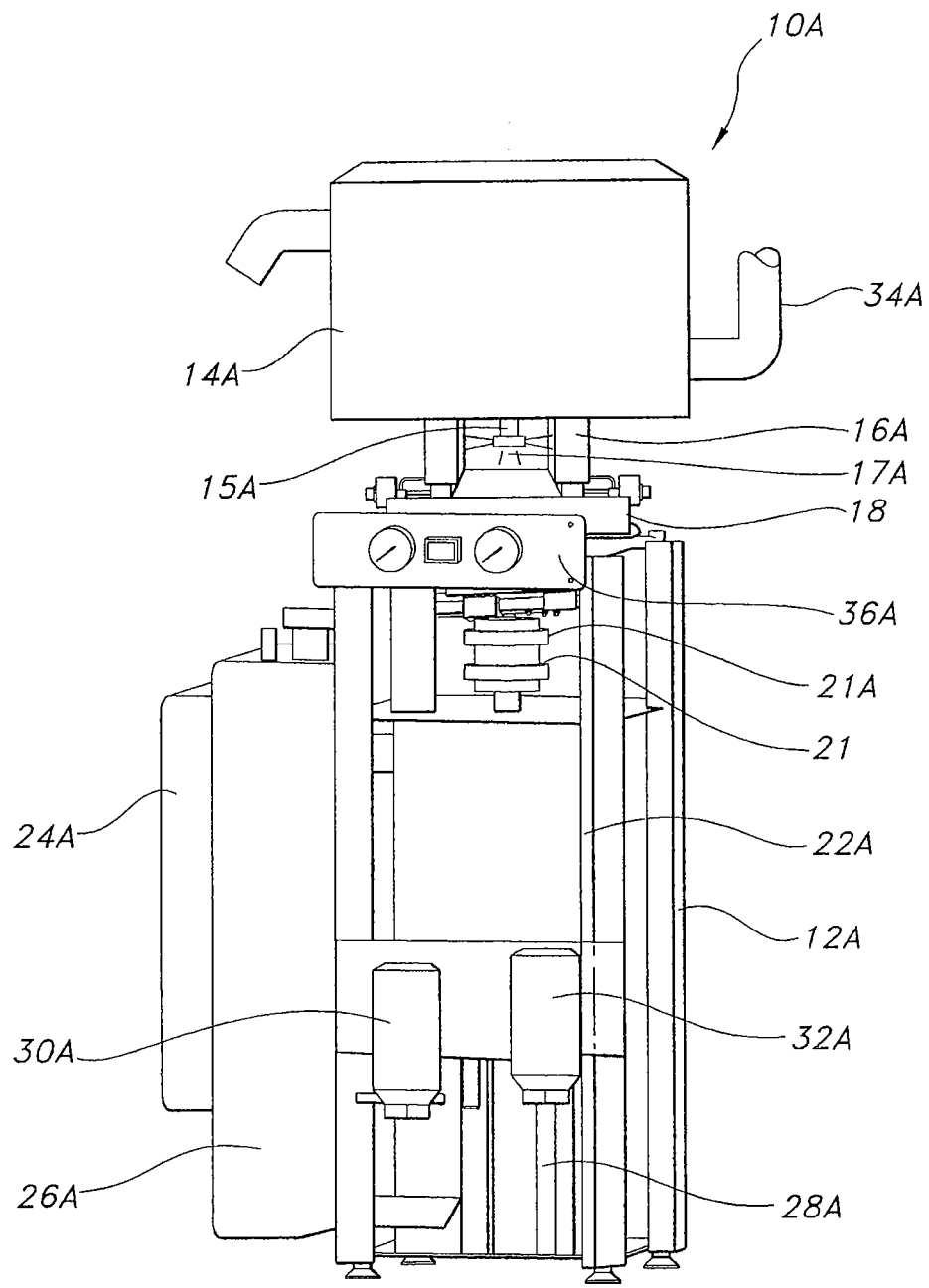
FIG. 3A shows an alternative potentially preferred embodiment of the overall electrical generation system with a different combustion chamber and feed line.

FIG. 3A shows an electrical generation device 10A with the same basic engine and recirculation components of the device 10 in FIG. 3 (and all the parts of FIG. 3 that are present in FIG. 3 are denoted with the same reference numbers, but with an "A" suffix). The different combustion chamber 14A is rectangular in shape with an exhaust pipe 34A on its side (rather than out its top). As well, the steam feed lines 17A lead through a center feed 15A rather than through four separate lines (as shown by 16 in FIG. 3).

Figure 4A:
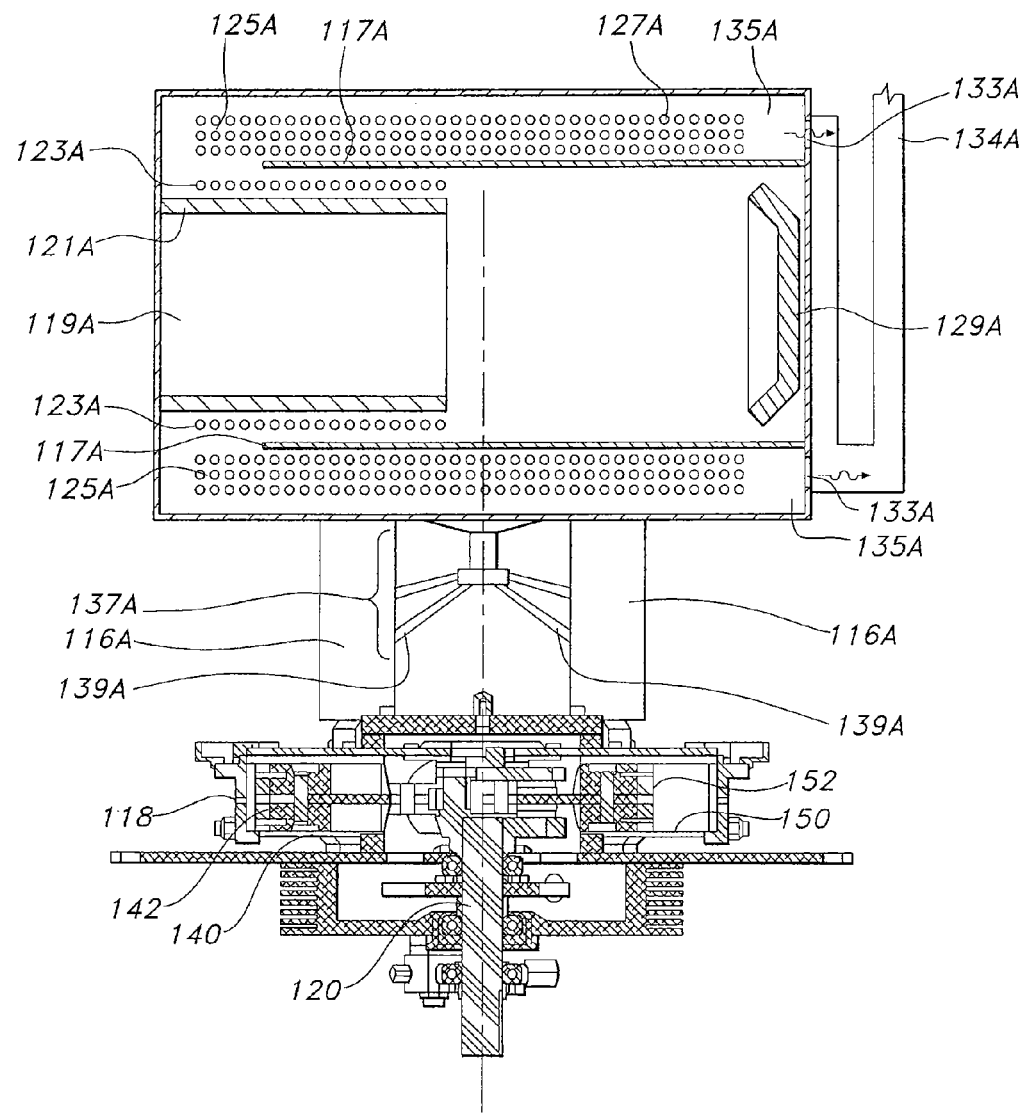
FIG. 4A is a side cross-sectional depiction of the alternative potentially preferred electrical generation device shown in FIG. 3A.

FIG. 4A shows the internal components of the rectangular combustion chamber 115A (14A of FIG. 3) including a heating manifold 119A formed by a refractory tube 121A around which working fluid transporting coils 123A are wound. An energy retention disc 129A reflecting plate is present on the opposite end of the chamber to permit the generated heat to circulate through the manifold to allow for efficient and optimal exposure of the working fluid coils 123A. The working fluid can then be properly heated upon the combustion step to create the necessary steam for eventual transport to the engine device 118 through transfer lines 116A, 137A, 139A. Open space resides within the manifold 119A and within the spaces in which the working fluid coils 123A are present to allow for further and maximum exposure to the generated heat from the combustion of the fuel/gases. A pass divider 117A is present to create a surrounding chamber 135A within which further delivery coils 125A are present around the entire manifold 119A. This surrounding chamber 135A leads to exhaust ways 133A that lead to a shared exhaust pipe 134A to delivery the exhaust gases subsequent to combustion and heat exposure for the working fluid. The delivery coils 125A lead the steam (former working fluid) to a central steam feed line 137A that, in turn, shunts into separate feed lines 139A in a radial fashion to steam feed lines 116A on to the engine 118. Such a different combustion chamber provides highly effective and efficient steam generation through proper exposure to high temperatures subsequent to combustion of the fuel. If desired, however, the working fluid coils 123A may be present over the entire manifold 119A; however, it has been realized that the capability of providing greater open space within the manifold to allow for greater retention of high temperatures for more effective steam generation, as well as potentially longer retention of steam for transport through the engine for more reliable and efficient electrical generation.

The working fluid coils (tubes) within either of the potentially preferred, non-limiting, combustion chambers described in relation to FIGS. 4 and 4A, above, may be of any length and diameter to fit within the spaces provided and to allow for optimal exposure to combustion heat sources to cause the working fluid therein to become gaseous in nature. Thus, tube coils with outer diameters of from ¼ inch to ⅝ inch, preferably about ⅜ inch, with a number of coils (turns) from 35 to 45 around the combustion chamber (in FIG. 4 circling the chamber, in FIG. 4A surrounding the refractory tube). Additionally, the further coils (tubes) that lead from the combustion chamber to the feed lines to the engine are similar in configuration, as well.

As noted above, one alternative to prevent overflow and/or pressure buildup of liquid fuel as it is fed to the combustion chamber is a reservoir designed to permit efficient utilization of fuel supply (again, a direct feed line may provide an effective remedy for such potential problems, as well). In one potential embodiment, a double-walled siphon reservoir is included for this purpose. FIG. 5 shows such a potentially preferred reservoir 500 with an inner chamber 510. The space between the two chambers 520 continuous holds overflow from the inner chamber 510 with a tank line 550 leading back to the fuel tank (200 of FIG. 1). In this manner, a reservoir line 530 transfers fuel from the tank to the inner chamber 510, where the fuel is deposited within the inner chamber 510 for siphoning by a combustion line 540 to deliver fuel to the combustion chamber (14 of FIG. 3). Since the amount of fuel to be siphoned by the combustion line 540 is rather small, but the continued delivery of appropriate amounts of fuel is necessary to continuously operate the overall device, the double-walled reservoir 500 provides this capability without wasting any of the fuel source itself.

With a liquid fuel source, the combustion step may require means to increase the available surface area of the fuel, particularly to reduce the temperature necessary to effectuate proper and complete incineration of the fuel itself. To that end, FIG. 5 provides one potentially preferred embodiment includes an atomizer component 575 within and attached to the combustion chamber 580. The component 590 includes a fuel pre-heater 560 to which a combustion line 550 from the fuel reservoir (as in FIG. 5) is attached for the delivery of liquid fuel thereto. The pre-heater 560 increases the fuel temperature to an initial level of 120 to 160° C. in order to facilitate atomization thereof. An atomizer line 570 then leads into the combustion chamber 580 and directly to the atomizer device 590 which subsequently separates the pre-heated liquid fuel into any range of sizes from droplets to a fine mist. The resultant atomized liquid exit's the atomizer 590 into the presence of an igniter 600 whereupon the resultant atomized fuel is ignited (in the presence of oxidizer) to generate sufficient heat to then transfer to the heat exchanger (160 of FIG. 4).

The continued generation of heat through these procedures, thus leads to the transfer of steam to a steam engine for mechanical energy generation. The potentially preferred engine is provided in FIGS. 7 through 12D. Referring to the several views of these drawings, and initially FIG. 4, the steam engine component of the present invention is shown and is generally indicated as 10. An upper portion 12 of the engine 10 has a radial arrangement of cylinders 20. Low pressure (i.e., generally between 20 psi-200 psi), low temperature (i.e., generally between 400° F. to 1000° F.) steam is generated from the combustion chamber (14 of FIG. 3, 14A of FIG. 3A). The low pressure, low temperature steam is directed through a steam line (16 of FIG. 3, 15A of FIG. 3A) that connects to a steam inlet port 19 on a generally circular manifold 18 that is supported on the upper portion 12 of the engine 10. Manifold 18 is structured and disposed to equally distribute the low pressure to intake valves at each cylinder 20. A central portion 14 of the engine 10 includes the condenser 30 including a chamber 32 that is surrounded by a folded star-shaped condenser wall 34. The steam present within the steam line (16 of FIG. 3, 16A of FIG. 3A) and that is transported through the engine 10 is sent through a cooling fan (24 of FIG. 3, 24A of FIG. 3A) and radiator (26 of FIG. 3, 26A of FIG. 3A) to condense and is either returned to the combustion chamber (14 of FIG. 3, 14A of FIG. 3A) or to the engine 110 as a lubricant and coolant. A fluid pump 136 on the engine is driven by rotation of the crankshaft (20 of FIG. 3, 20A of FIG. 3A).

Figure 7:
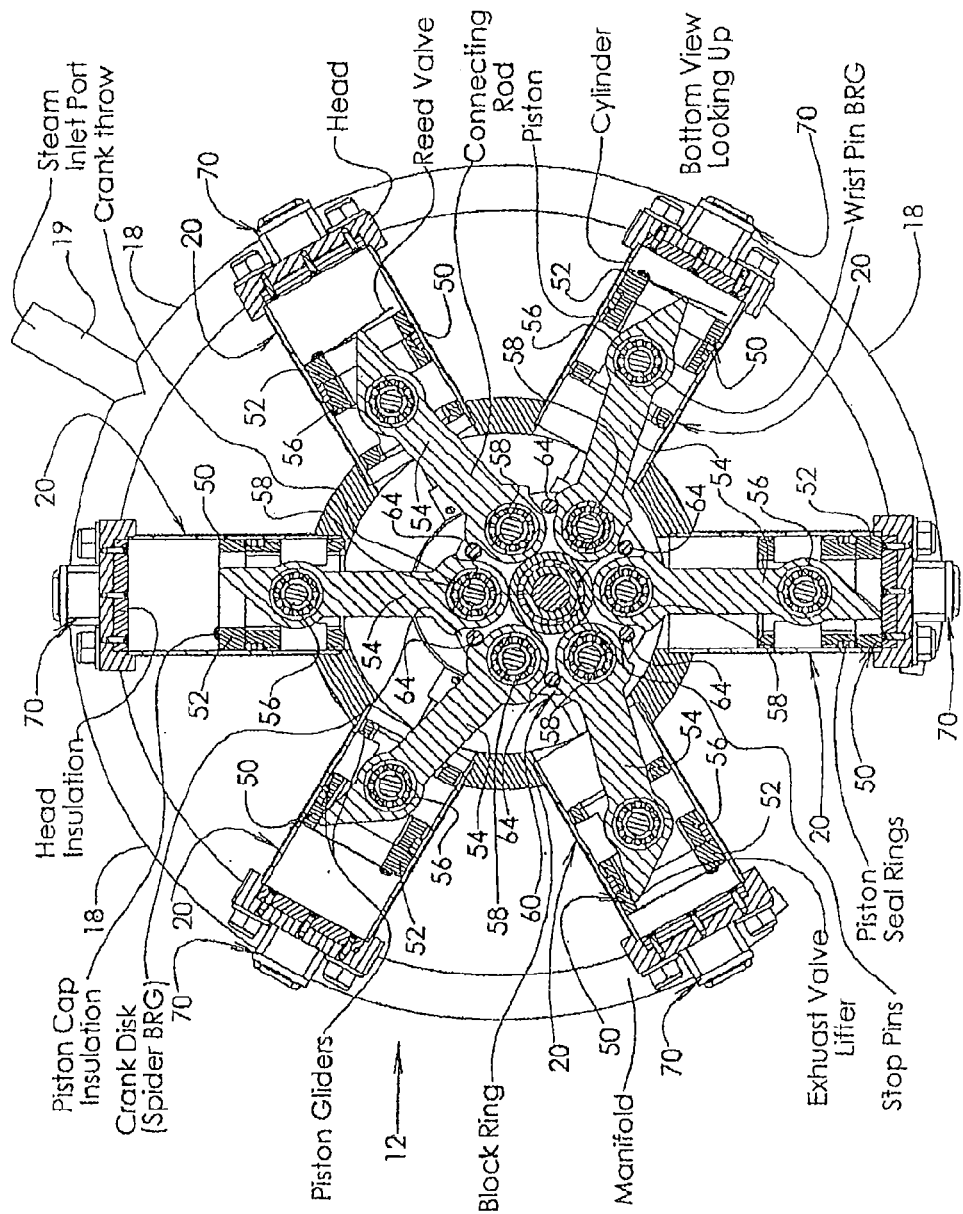
FIG. 7 is an isolated top plan view showing a spider bearing (i.e., crank disk) and a piston and cylinder arrangement of the waste heat engine.

Referring to FIG. 7, each cylinder 20 in the radial arrangement includes a reciprocating piston assembly 50, including a piston head 52 that moves in a reciprocating motion within the cylinder 20 through a full piston stroke. A connecting rod 54 is pivotally linked to the piston head 52 and a central crank disk or spider bearing 60. More specifically, the connecting rod 54 of each piston assembly 50 is pivotally linked at an upper end to the piston head 52 with a wrist pin bearing 56. Similarly, a lower end of the connecting rod 54 is pivotally linked to the crank disk 60 with a wrist pin bearing 58. The crank disk 60 is eccentrically fixed to the crankshaft 24. More particularly, a crank arm on the crankshaft 24 is rotatably fitted to the center of the crank disk 60 so that the center of the crank disk 60 is offset relative to the longitudinal axis of the crankshaft 24. As steam is injected into the top of each cylinder 20 and the piston 52 is moved downwardly within the cylinder, the connecting rod 54 pivots and transmits a force on the crank disk 60 that is offset relative to the longitudinal central axis on the crankshaft 24, thereby causing the crank disk 60 to move in an orbiting motion around the central longitudinal axis of the crankshaft 24, as the crankshaft is turned. Movement on the crank disk 60 about a full orbital motion, with a complete turn of the crankshaft 24, causes the lower pivoting end of each connecting rod 54 to travel through a circular path, as indicated by the arrow in FIGS. 12A-12D. Restrictor pins 64 associated with each cylinder are fixed to the crank disk 60 and are specifically spaced and arranged relative to one another so as to abut against ears 59 on the lower end of the connecting rod 54 to limit angular deflection of each connecting rod 54.

Figure 8:
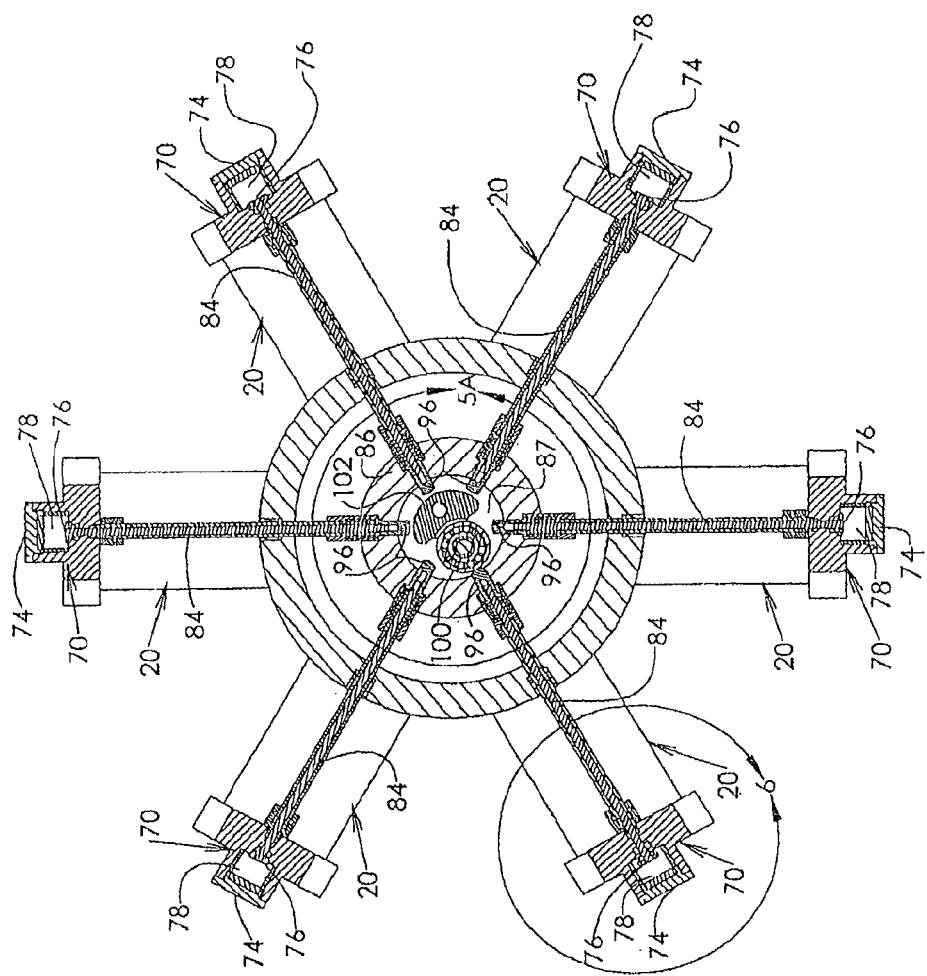
FIG. 8 is an isolated top plan view in cross-section, showing a steam intake valve and intake valve control assembly for controlling a low pressure steam or gas injection into each of the cylinders of the waste heat engine.
Figure 9:
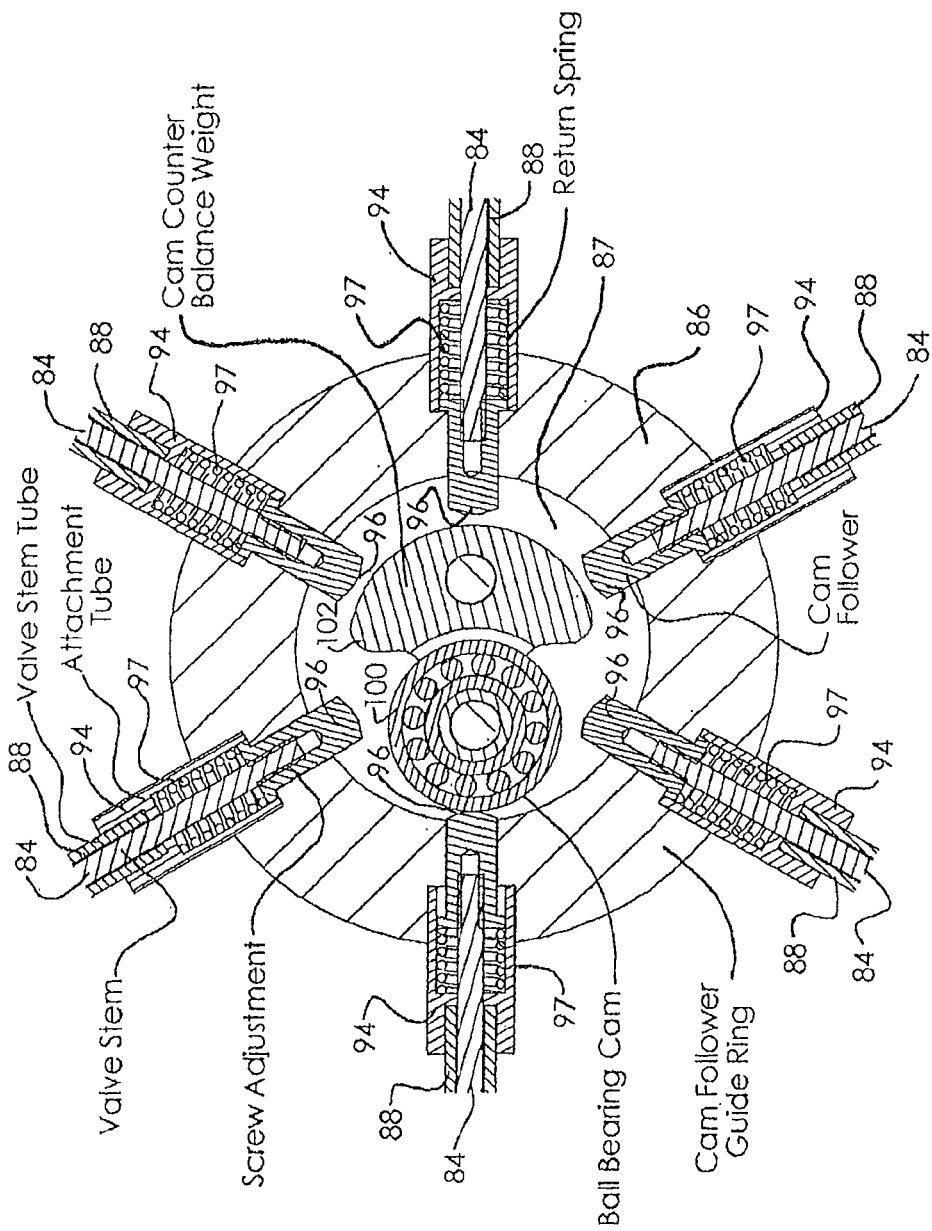
FIG. 9 is an isolated top plan view, shown in cross-section view as number 5A in FIG. 8 showing a bearing cam roller in positional contact with one cam follower on an inboard and of a valve stem, thereby urging the intake valve on the opposite end of the valve stem to an open position.
Figure 10:
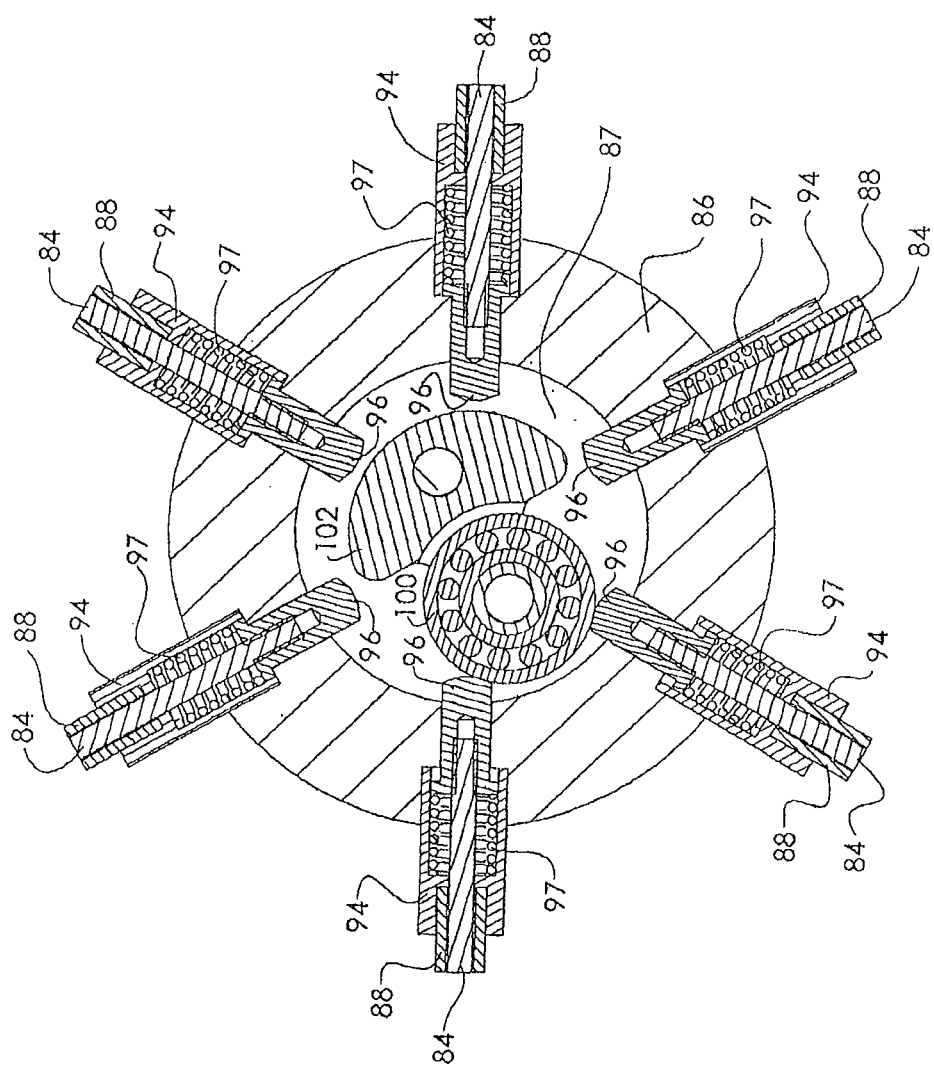
FIG. 10 is an isolated view, shown in cross-section, taken from the area indicated as 6 in FIG. 8, showing an intake valve at one of the cylinders in an open position to thereby allow injection of low pressure steam or gas into the top of the cylinder.
Figure 11:
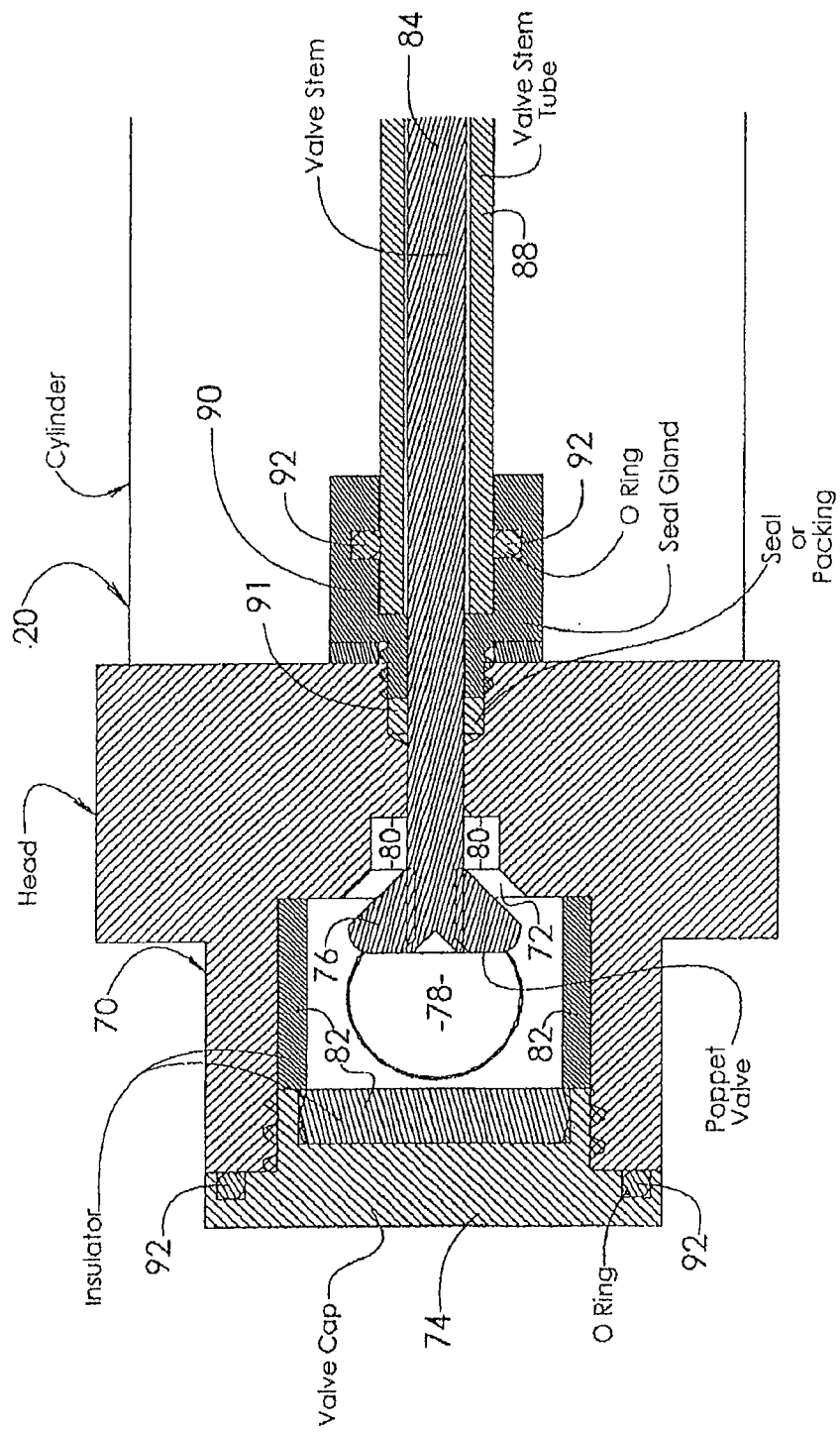
FIG. 11 is an isolated view, shown in cross-section, showing the intake valve of FIG. 10 in a closed position.
Figure 12:
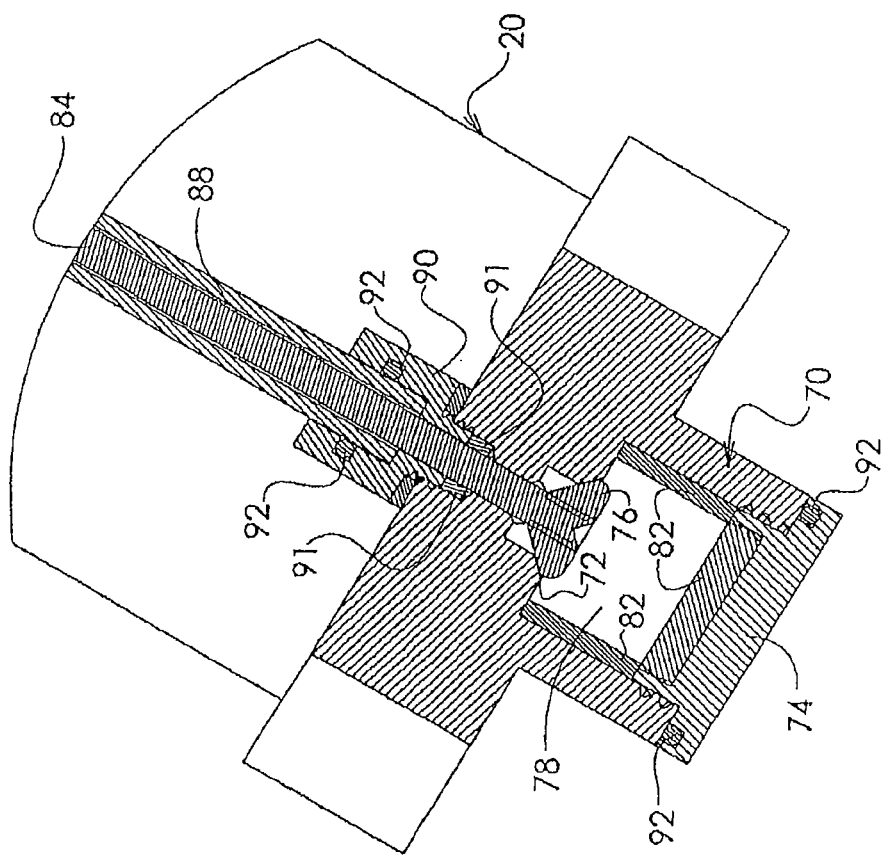
FIG. 12 is an isolated view, shown in cross-section, of the intake valve of FIG. 11 in closed position.
Figure 12:
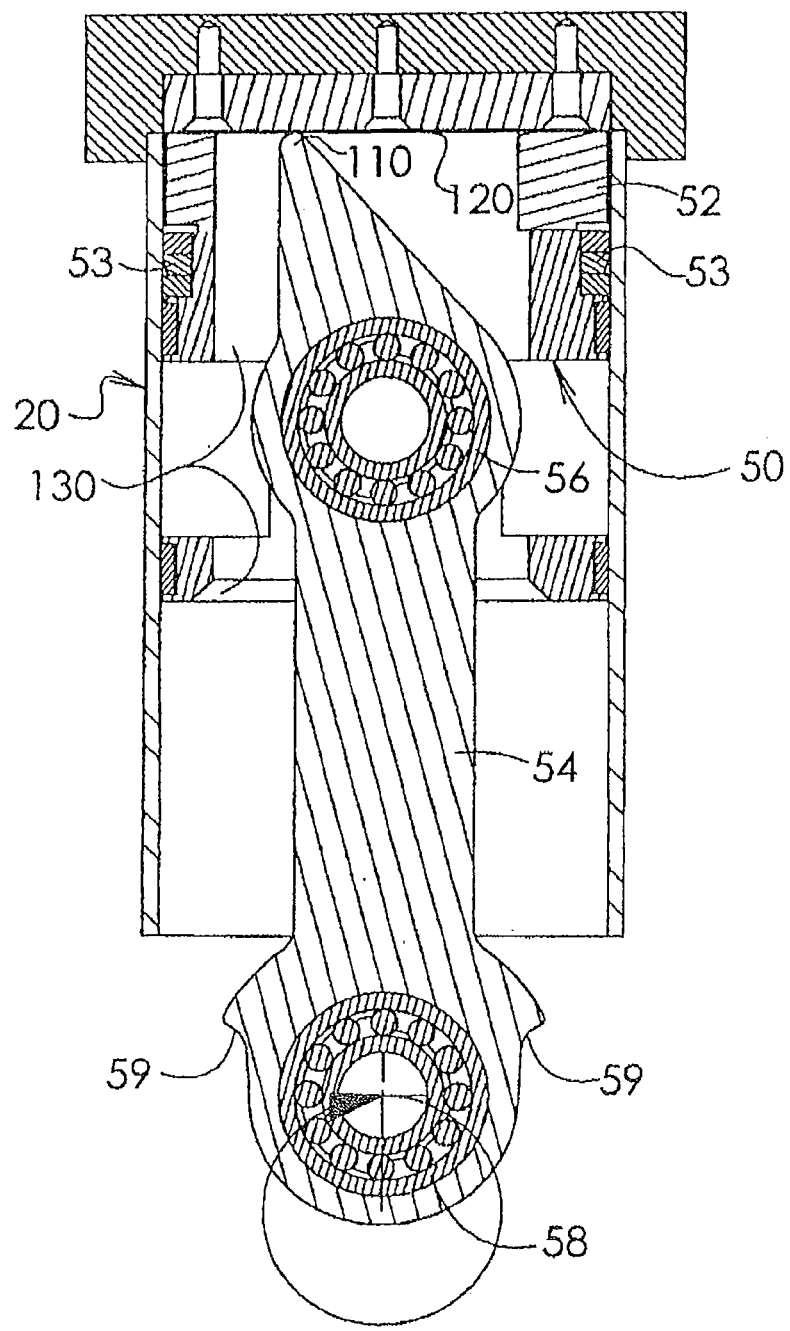
Figure 12:
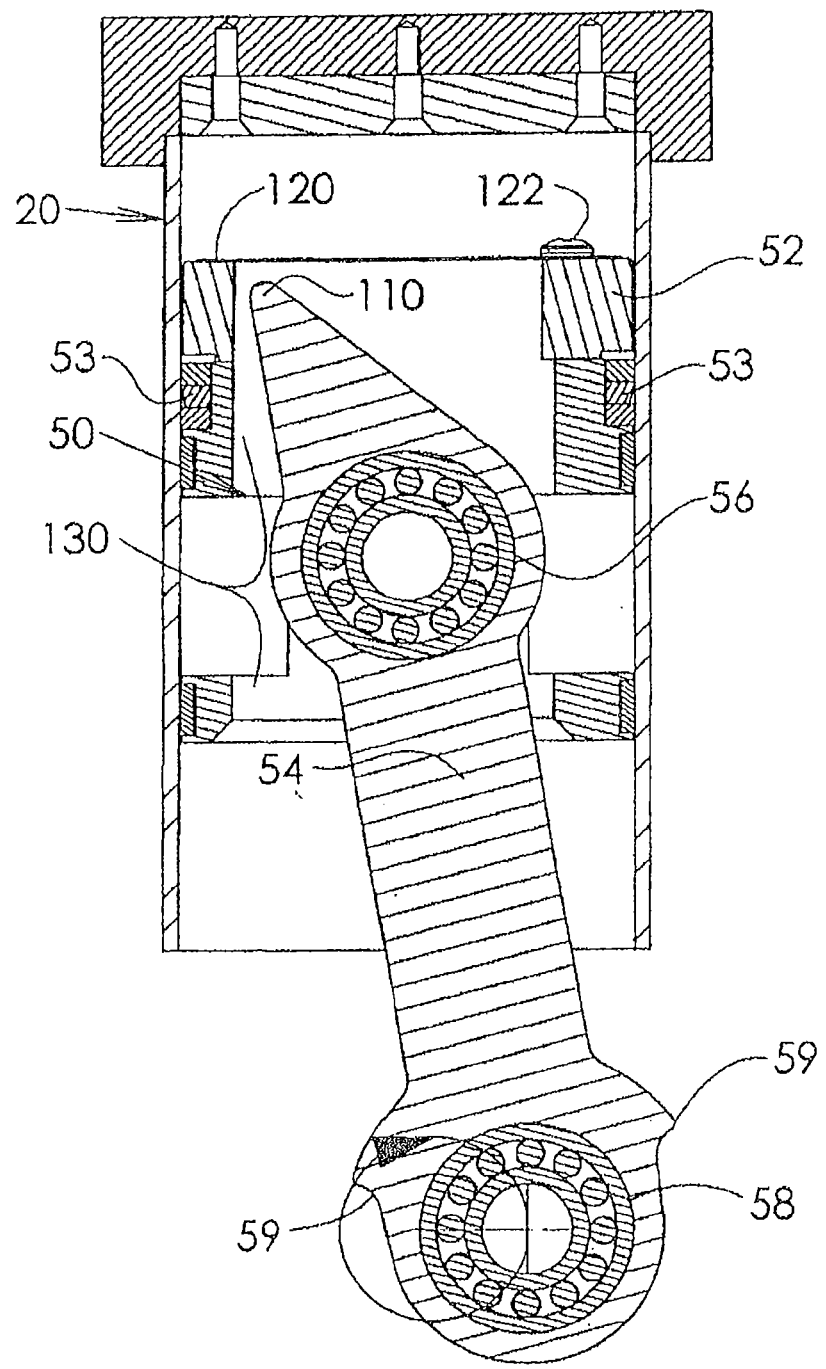
Figure 12:
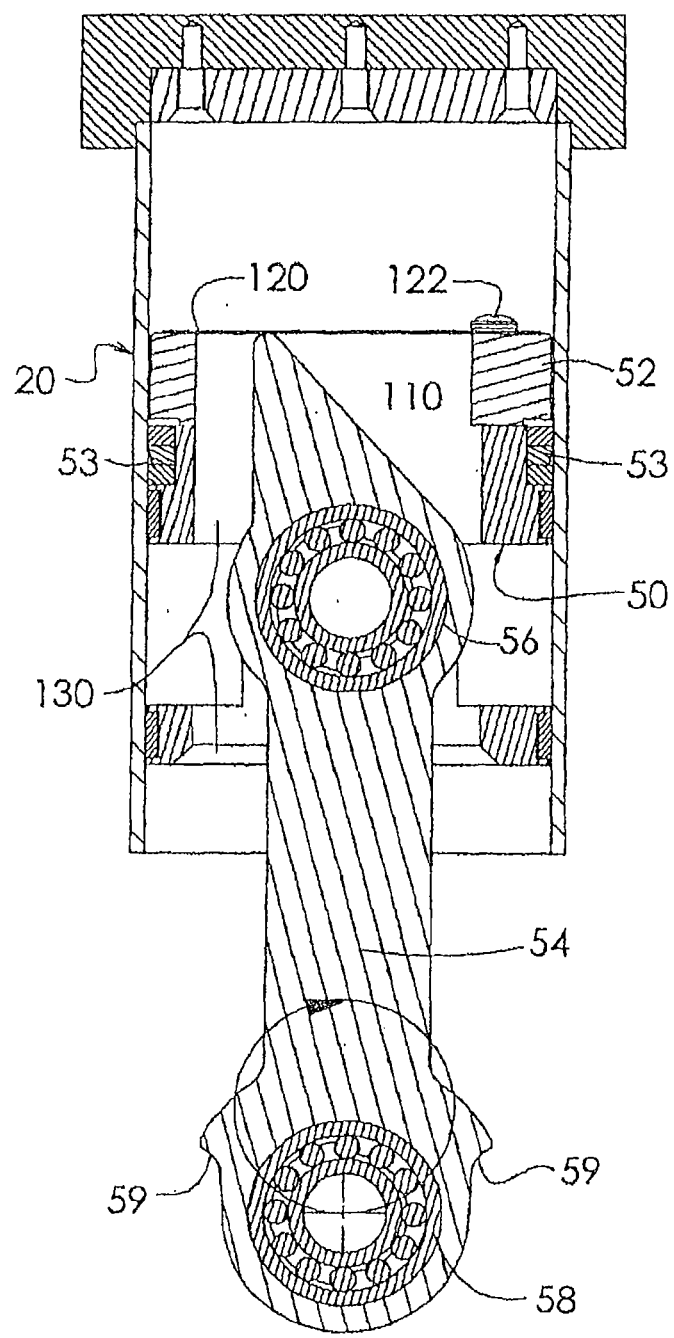
Figure 12:
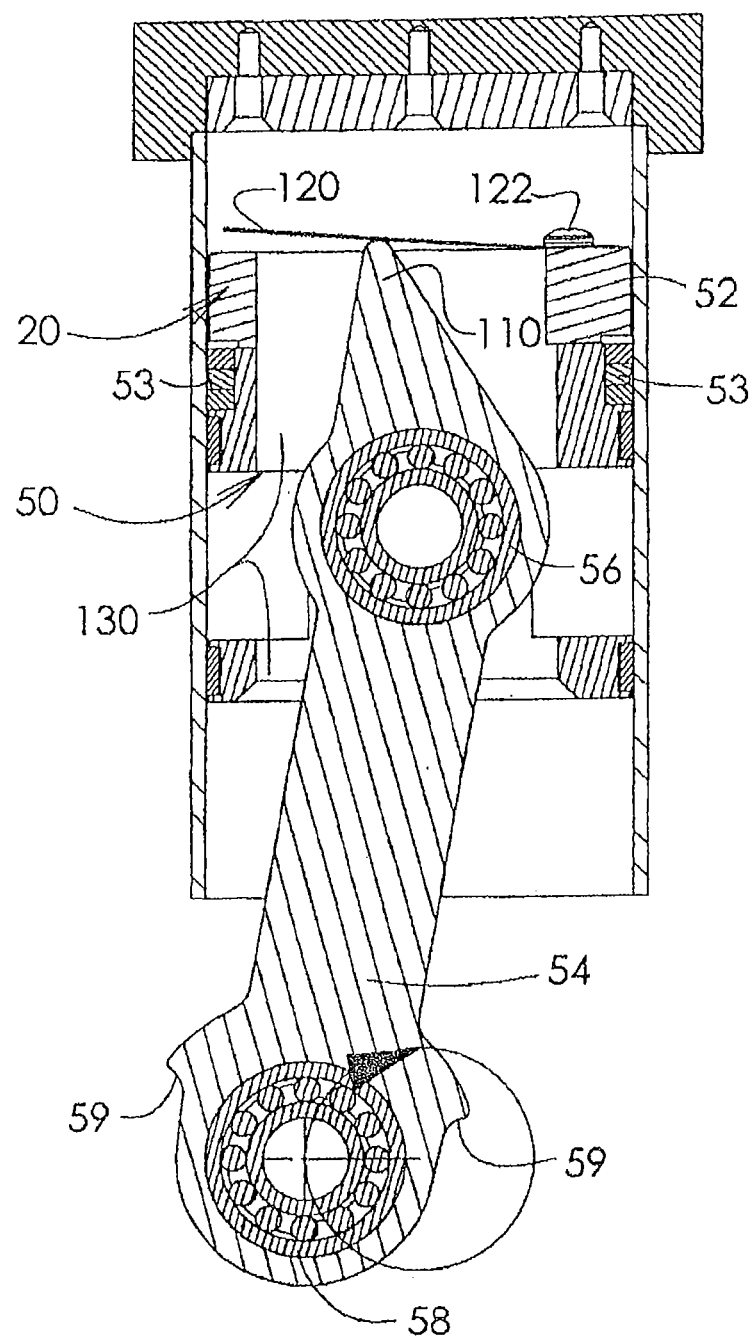

The steam injection valve assembly is shown in FIGS. 8-11. Referring to FIGS. 8, 10 and 11, a valve head 70 is located at the top of each cylinder. The valve head includes a valve seat 72 and a valve cap 74. A poppet valve 76 moves in relation to the valve seat 72, between an open position (see FIG. 10) and a closed position (see FIG. 11). Steam from the manifold 18 is directed into a valve chamber 78 within the valve head 70 and, when the poppet valve 76 is opened, the steam is injected through a port 80 and into the top of the cylinder 20. The valve chamber 78 is surrounded by an insulating material 82 to maintain the temperature of the steam within the chamber 78 when the valve 76 is closed. An elongate valve stem 84 extends from the poppet valve 76 inwardly towards a cam follower guide ring 86, as seen in FIGS. 8-9B. Referring to FIG. 8, it is seen that the valve stems 84 are arranged in the same radial configuration as the cylinders 20, with the valve stems 84 extending from the valve heads 70 at the top of the cylinders and inwardly to the cam follower guide ring 86. The valve stems 84 each extend through a valve stem tube 88 that is fitted to a seal gland 90 at the base of the valve head 70. A seal packing 91 and an O-ring 92 help to discourage escape of the steam from the valve head 70. An opposite inboard end of the valve stem tube 88 is fitted to an attachment tube 94 that extends into the cam follower guide ring 86. Cam followers 96 fitted to the end of each valve stem 84 are positioned to extend radially inward into an area 87 within the cam follower guide ring 86 at equally spaced intervals relative to the inner circumference of the guide ring. The cam followers 96 are urged inwardly towards the area within the guide ring by return springs 97 within the respective attachment tubes 94.

A ball bearing cam roller 100 is connected to the top of the spider bearing and/or a crank throw linked to the crankshaft. The cam roller 100 orbits about a circular path within the interior area 87 surrounded by the cam follower guide ring 86. A cam counter-balance weight 102 stabilizes movement of the cam roller 100 as it moves in the eccentric path within the cam follower guide ring 86. The cam roller 100 is specifically sized, structured and disposed for contacting the cam followers 96 on the ends of the valve stems 84. More particularly, as the cam roller 100 moves about the orbital path, it is in contact, at all times with at least one cam follower 96. Movement of the pistons 50 to drive the spider bearing 60 and the crankshaft 24 serves to also move the cam roller 100 in its circular path. As the cam roller 100 contacts each cam follower 96, the associated valve stem 84 is urged axially outward to open the respective poppet valve 76, thereby injecting steam into the associated cylinder 20. As previously noted, the cam roller 100 is always in contact with at least one cam follower 96, so that at any given moment, steam is being injected into at least one cylinder. As the cam roller 100 moves away from one cam follower 96, it simultaneously contacts the next cam follower 96, so that there is an overlap period of steam injection into two adjacent cylinders.

Referring to FIGS. 12A-12D, each piston assembly 50 within a respective cylinder 20 includes piston head 52 with a seal 53 that engages the inner wall surfaces of the cylinder. As the connecting rod 54 is angularly displaced during the exhaust stroke (see FIG. 12D), a valve lifter 110 on the top end of the connecting rod 54, defined by a generally triangular formation with an apex, hits an exhaust reed valve 120 on the top of the piston head 52. The valve lifter 110 urges the exhaust reed valve 120 from a relaxed position to a raised position, against the force of the spring action of the reed valve flap which is secured at one end by fastener 122 to the piston head 52. With the reed valve flap 120 in the open position, as seen in FIG. 11D, the low pressure steam in the upper portion of the cylinder is released through ports 130 formed through the piston head 52, allowing the steam to exhaust into a condenser chamber 132 of the engine 10 as the piston 50 returns to the top dead center position. In such an engine, the cylinders 52 of the engine are arranged in a radial configuration with the cylinder heads 51 and valves 53 extending into the cyclone furnace. A cam 70 moves pushrods 74 to control opening of steam injection valves 53. At higher engine speeds, the steam injection valves 53 are fully opened to inject steam into the cylinders 52, causing piston heads 54 to be pushed radially inward. Movement of the piston heads 54 causes connecting rods 56 to move radially inward to rotate crank disk 61 and crankshaft 60. Each connecting rod 56 connects to the crank disk 61. More specifically, the inner circular surface of the connecting rod link is fitted with a bearing ring 59 for engagement about hub 63 on the crank disk 61. In a preferred embodiment, the crank disk 61 is formed of a bearing material which surrounds the outer surface of the connecting rod link, thereby providing a double-backed bearing to carry the piston load. The connecting rods 56 are driven by this crank disk 61. These rods are mounted at equal intervals around the periphery of this circular bearing. The lower portions of the double-backed bearings joining the piston connecting rods to the crank disk 61 are designed to limit the angular deflection of the connecting rods 56 so that clearance is maintained between all six connecting rods during one full rotation of the crankshaft 60. The center of the crank disk 61 is yoked to a single crankshaft journal 62 that is offset from the central axis of the crankshaft 60. While the bottom ends of the connecting rods 56 rotate in a circle about the crank disk 61, the offset of the crank journal 62 on which the crank disk 61 rides creates a geometry that makes the resultant rotation of these rods travel about an elliptical path. This unique geometry confers two advantages to the operation of the engine. First, during the power stroke of each piston, its connecting rod is in vertical alignment with the motion of the driving piston thereby transferring the full force of the stroke. Second, the offset between the connecting rods 56 and the crank disk 61, the offset between the crank disk and the crank journal 62, and the offset of the crank journal 62 to the crankshaft 60 itself, combine to create a lever arm that amplifies the force of each individual power stroke without increasing the distance the piston travels. Accordingly, the mechanical efficiency is enhanced. This arrangement also provides increased time for steam admission and exhaust.

Steam under super-critical pressure is admitted to the cylinders 52 of the engine by a mechanically linked throttle mechanism acting on the steam injection needle valve 53. To withstand the 600-1,000° F. operating temperatures, the needle valves 53 are water cooled at the bottom of their stems by water piped from and returned to the condenser 30 by a water lubrication pump 96. Along the middle of the valve stems, a series of labyrinth seals, or grooves in the valve stem, in conjunction with packing rings and lower lip seals, create a seal between each valve stem and a bushing within which the valve moves. This seals and separates the coolant flowing past the top of the valve stem and the approximate 225 psi pressure that is encountered at the head and seat of each valve. Removal of this valve 53, as well as adjustment for its seating clearance, can be made by threads machined in the upper body of the valve assembly. The needle valve 53 admitting the super-heated steam is positively closed by a spring 82 within each valve rocker arm 80 that is mounted to the periphery of the engine casing. Each spring 82 exerts enough pressure to keep the valve 53 closed during static conditions.

The motion to open each valve is initiated by a crankshaft-mounted cam ring 84. A lobe 85 on the cam ring forces a throttle follower 76 to 'bump' a single pushrod 74 per cylinder 52. Each pushrod 74 extends from near the center of the radially configured six cylinder engine outward to the needle valve rocker 80. The force of the throttle follower 76 on the pushrod 74 overcomes the spring closure pressure and opens the valve 53. Contact between the follower, the rocker arm 80, and the pushrod 74 is determined by a threaded adjustment socket mounted on each needle valve rocker arm 80.

Throttle control on the engine is achieved by varying the distance each pushrod 74 is extended, with further extension opening the needle valve a greater amount to admit more super-heated fluid. All six rods 74 pass through a throttle control ring 78 that rotates in an arc, displacing where the inner end of each push rod 74 rests on the arm of each cam follower (see FIG. 8). Unless the follower 76 is raised by the cam lobe 85, all positions along the follower where the push rod 74 rests are equally 'closed'. As the arc of the throttle ring 78 is shifted, the resting point of the push rod 74 shifts the lever arm further out and away from the fulcrum of the follower. When the follower 76 is bumped by the cam lobe 85, the arc distance that the arm traverses is magnified, thereby driving the push rod 74 further, and thus opening the needle valve 53 further. A single lever attached to the throttle ring and extending to the outside of the engine casing is used to shift the arc of the throttle ring, and thus becomes the engine throttle.

As the throttle ring 78 is advanced, more steam is admitted to the cylinder, allowing an increase in RPM. When the RPM increases, the pump 90 supplies hydraulic pressure to lift the cam ring 84 to high speed forward. The cam ring 84 moves in two phases, jacking up the cam to decrease the cam lobe duration and advance the cam timing. This occurs gradually as the RPM's are increased to a pre-determined position. The shift lever 102 is spring loaded on the shifting rod 104 to allow the sleeve 86 to lift the cam ring 84.

To reverse the engine, it must be stopped by closing the throttle. Reversing the engine is not accomplished by selecting transmission gears, but is done by altering the timing. More specifically, reversing the engine is accomplished by pushing the shift rod 104 to lift the cam sleeve 86 up the crankshaft 60 as the sleeve cam pin 88 travels in a spiraling groove in the cam ring causing the crank to advance the cam past top dead center. The engine will now run in reverse as the piston pushes the crank disk at an angle relative to the crankshaft in the direction of reverse rotation. This shifting movement moves only the timing and not the duration of the cam lobe to valve opening. This will give full torque and self-starting in reverse. High speed is not necessary in reverse.

Exhaust steam is directed through a primary coil which also serves to preheat the water in the generator (22 of FIG. 3, 22A of FIG. 3A). The exhaust steam is then directed through the condenser 30, in a centrifugal system of compressive condensation. As described above, the cooling air circulates through the flat plates, is heated in an exhaust heat exchanger 42 and is directed into the burner 40. This reheat cycle of air greatly adds to the efficiency and compactness of the engine.

The water delivery requirements of the engine are served by a poly-phase pump 90 that comprises three pressure pump systems. One is a high pressure pump system 92 mounted adjacently within the same housing. A medium pressure pump system 94 supplies the water pressure to activate the clearance volume valve and the water pressure to operate the cam timing mechanism. A lower pressure pump system 96 provides lubrication and cooling to the engine. The high pressure unit pumps water from the condenser sump 34 through six individual lines 21, past the coils of the combustion chamber 22 to each of the six needle valves 53 that provide the super-heated fluid to the power head of the engine. This high pressure section of the poly-phase pump 90 contains radially arranged pistons that closely resemble the configuration of the larger power head of the engine. The water delivery line coming off each of the water pump pistons is connected by a manifold 98 that connects to a regulator shared by all six delivery lines that acts to equalize and regulate the water delivery pressure to the six pistons of the power head. All regulate the water delivery pressure to the six pistons of the power head. All pumping sub units within the poly-phase pump are driven by a central shaft. This pump drive shaft is connected to the main engine crankshaft 60 by a mechanical coupler. When the engine is stopped, an auxiliary electric motor pumps the water, maintaining the water pressure necessary to restarting the engine.

Thus, the overall all-in-one device includes, as necessary components, a working fluid pump, a used fuel source heater, a dual container siphon reservoir, at least one combustion air fan, a combustion chamber with coiled metal (such as, as one example, stainless steel) lines for water/steam movement, one fuel injector with an igniter, an exhaust system, a shaft coupling, an electrical generator, a cooling fan and radiator assembly, a condensing reservoir, an air compressor (optional), and a specific steam engine with radial cylindrical pistons attached to a cam shaft. Such components are provided, with other switches, proper tubing and wiring, and other components, such as measurement gauges, mounting plates, and a metal frame, to provide a compact and efficient device to generate electricity through a portable configuration and through the utilization of waste oil, diesel, gasoline, natural gas, methane or syngas fuel sources.

The specific steam engine itself includes, as necessary components, a condenser, a steam generator and a main engine section having valves, cylinders, pistons, pushrods, a main bearing, cams and a camshaft. Ambient air is introduced into the combustion chamber by intake blower(s). In the combustion chamber, the air is mixed with fuel from a fuel atomizer and ignited by an electric igniter. The burner burns the atomized fuel in a combustion chamber sized properly to allow for complete incineration of the fuel. The hot gases travel over the super heater coils (larger tubes nearest the flame) and then redirected over the remaining coiled tubes before it is exhausted out the flue. The steam temperature in the tube(s) will reach temperature of between 450 to 600 degrees F. The cylinders of the engine are arranged in a radial configuration. In the combustion chamber, the steam is super heated and maintained at a pressure up to approximately 200 to 300 psi.

The exhaust steam is directed through a condenser located directly under the pistons. From there the fluid/steam travels through a radiator on its way to the condensing tub at the bottom of the total device. As noted above, the heat from the condenser may be captured and utilized to heat a space adjacent to the device or even transferred through ducts to a selected area. With the continued recycling of the working fluid, the condenser will continuously exhibit an exothermic state that permits such a beneficial function.

The speed and torque of the engine are controlled by a rocker and cam design which serves to open and close a needle type valve in the engine head. When the valve is opened, high pressure, high temperature steam is injected into the cylinder and allowed to expand on the top of the piston high pressure. In addition, it provides such a system wherein such at least one electrical network further comprises at least one connection to at least one larger electrical grid. The overall device may also be connected to a single or multiple electrical outlets (or even directly into apparatuses that utilize electricity generated in such a fashion), if desired.

Figure 13:
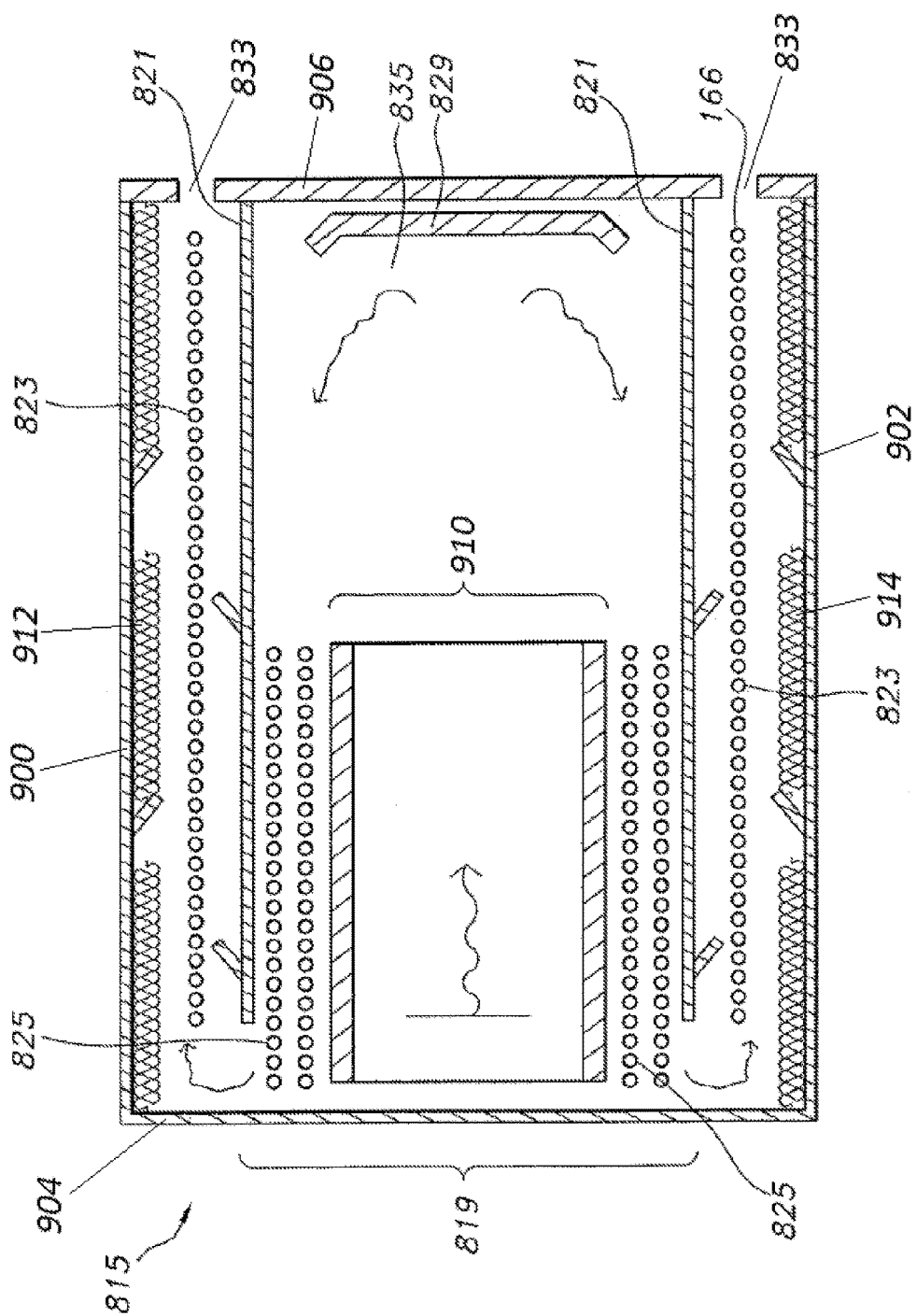
FIG. 13 is a detailed cross-sectional view of one potentially preferred embodiment of an inventive heat exchange device.

FIG. 13 shows the internal components of an inventive heat exchange device 815 including a heating manifold 819 formed by a refractory tube 821 around which working fluid transporting coils 823 are wound. An energy retention disc 829 reflecting plate is present on the opposite end of the chamber to permit the generated heat to circulate through the manifold to allow for efficient and optimal exposure of the working fluid coils 823. The working fluid can then be properly heated upon the combustion step to create the necessary steam for eventual transport to the engine device (850 of FIG. 14, for example). Open space resides within the manifold 819 and within the spaces in which the working fluid coils 823 are present to allow for further and maximum exposure to the generated heat from the combustion of the fuel/gases. The refractory tube 821 further creates a surrounding chamber 835 within which further delivery coils 825 are present around the entire manifold 819. This surrounding chamber 835 leads to exhaust ways 833 that lead to a shared exhaust pipe (842 in FIG. 14) to deliver the exhaust gases subsequent to combustion and heat exposure for the working fluid. The delivery coils 825 lead the steam (former working fluid) to a central steam feed line (857 of FIG. 14) that on to the engine (850 of FIG. 14). Such a different combustion chamber provides highly effective and efficient steam generation through proper exposure to high temperatures subsequent to combustion of the fuel. If desired, however, the working fluid coils 823 may be present over the entire manifold 819; however, it has been realized that the capability of providing greater open space within the manifold to allow for greater retention of high temperatures for more effective steam generation, as well as potentially longer retention of steam for transport through the engine for more reliable and efficient electrical generation.

The working fluid coils (tubes) 825 within either of the potentially preferred, non-limiting, combustion chambers must be within a specific diameter range to allow for a maximum number of coils to be present within the manifold 819 for the optimum surface area to be available for heat transfer to occur. Thus, tube coils with outer diameters of from ¼ inch to ½ inch, preferably about ⅜ inch to ½ inch, with a number of coils (turns) from 25 to 45 around the combustion chamber. Additionally, the further coils (tubes) that lead from the combustion chamber to the feed lines to the engine are similar in configuration, as well, with an egress coil egress 166 leading to the engine component (850 of FIG. 14).

Figure 14:
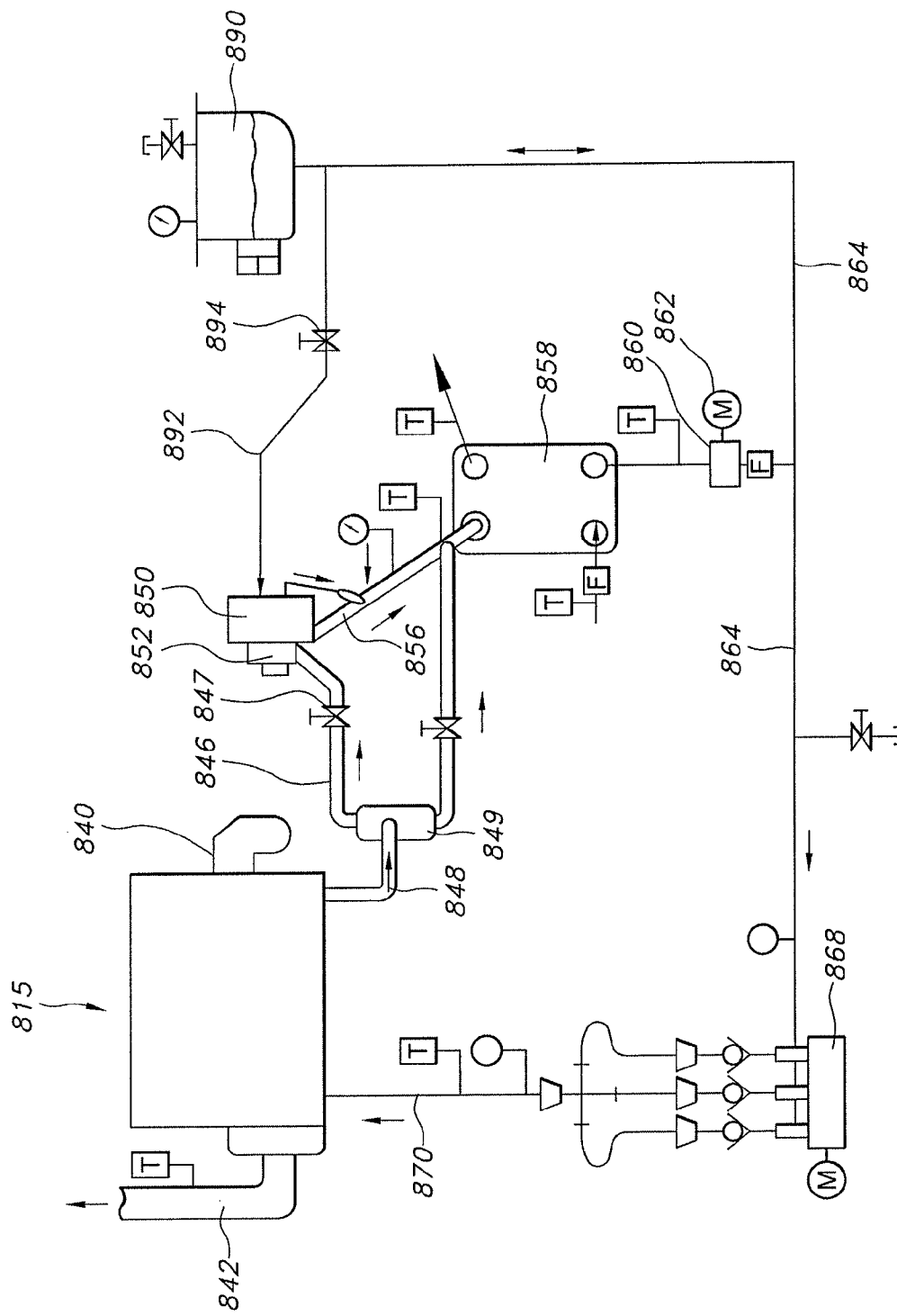
FIG. 14 is a diagram of a potentially preferred configuration of an inventive heat exchange device with a different type of turbine engine.

FIG. 14 thus shows a diagram of the heat exchange device 815 with a burner assembly 840 and an exhaust pipe 842. A water inlet 870 feeds working fluid (here, water, although other fluids may be utilized) into the heat exchange device 815 where it is converted to steam. A steam outlet 848 leads to a moisture separator 849 that aids in any removal of excess moisture that may be present within the steam generated from the heat exchange device 815. An engine inlet line 846 leads through a valve 847 to control supply of steam to a standalone turbine engine 850. This engine 850 includes a turbine component 852 that is operated through the introduction of dry steam from the heat exchange device 815. The pressure and heat from the steam turns the turbine 852 which then rotates a dynamo component 854 that generates electricity. The steam then exits the turbine 852 through a steam outlet 856 for collection within a condenser 858. The resultant moisture from the moisture separator 849 leads to the same condenser 858. In this manner, the used steam and/or residual moisture may be collected and converted back to liquid form to be recycled through the heat exchange device 815 again and, as well, through the turbine engine 850. The condenser 858 leads to a vacuum pump 860 and through a flow meter 862 to a condensation tube 864 and eventually a high pressure feed line 868. This, in turn, leads to the inlet feed line 870 that transports working fluid back to the heat exchange device 815. Additionally, the condenser 858 may also feed the fluid to a reservoir 890 for transport to the turbine engine 850 through a cooling inlet line 892 with a valve 894. In this manner, the working fluid may also be utilized as a coolant/lubricant within the engine 850 in addition to its function as a steam source.

A complete disclosure of the details and essence of this invention has been made, and the best modes of practicing it as now contemplated have been presented. It will be apparent to all skilled in the art that modifications, substitutions and additions may be made in the elements of the invention without departing from its concepts, the scope of which is defined and limited only by the ensuing claims.

I claim:

1. A heat exchanger comprising a housing having a top panel, a bottom panel, two side panels, a front panel, and an end panel;
    said housing further comprising therein:
        a heating manifold formed by a refractory tube, wherein said refractory tube is configured in perpendicular relation to and extending from said front panel such that said refractory tube includes an opening within said housing;
        a dividing tube that is configured in perpendicular relation to and extending from said end panel such that said dividing tube defines an opening within said housing within which is disposed said refractory tube;
        an energy retention disc disposed along the internal wall of said end panel, and thus substantially perpendicular to said dividing tube;
        at least one coiled tube encircling said dividing tube; and
        at least two exhaust ports disposed within said end panel and with one of said two exhaust ports disposed between said dividing tube and said top panel and the other of said two exhaust ports disposed between said dividing tube and said bottom panel, wherein said at least one coiled tube is disposed so as to carry a working fluid through said housing and the number of coils within said at least one coiled tube within said housing is within the range from 25 to 45.

2. The heat exchanger device of claim 1 wherein said at least one coiled tube exhibits an inner diameter of about ⅛ inch to about ½ inch and an outer diameter of from about ⅜ inch to about ¾ inch.

3. The heat exchanger of claim 2 wherein said housing further comprises therein coils that encircle said refractory tube and that are positioned intermediate said refractory tube and said dividing tube.

4. A combustion engine comprising the heat exchanger of claim 3 and an engine component.

5. A method of generating electrical charge through the utilization of the combustion engine of claim 4.

6. A combustion engine comprising the heat exchanger of claim 2 and an engine component.

7. A method of generating electrical charge through the utilization of the combustion engine of claim 6.

8. The heat exchanger of claim 1 wherein said top panel and said bottom panel are insulated.

9. A combustion engine comprising the heat exchanger of claim 8 and an engine component.

10. A method of generating electrical charge through the utilization of the combustion engine of claim 9.

11. The heat exchanger of claim 1 wherein heat is generated within said refractory tube and flows away from said refractory tube to said heating manifold.

12. A combustion engine comprising the heat exchanger of claim 11 and an engine component.

13. A method of generating electrical charge through the utilization of the combustion engine of claim 12.

14. A combustion engine comprising the heat exchanger of claim 1 and an engine component.

15. A method of generating electrical charge through the utilization of the combustion engine of claim 14.

* * * * *